US012107348B2

(12) United States Patent
Varel et al.

(10) Patent No.: US 12,107,348 B2
(45) Date of Patent: Oct. 1, 2024

(54) ROUTING AND LAYOUT IN AN ANTENNA

(71) Applicant: Kymeta Corporation, Redmond, WA (US)

(72) Inventors: Cagdas Varel, Seattle, WA (US); Steven Howard Linn, Hillsboro, OR (US)

(73) Assignee: KYMETA CORPORATION, Redmond, WA (US)

( * ) Notice: Subject to any disclaimer, the term of this patent is extended or adjusted under 35 U.S.C. 154(b) by 716 days.

(21) Appl. No.: 17/219,745

(22) Filed: Mar. 31, 2021

(65) Prior Publication Data

US 2021/0351512 A1 Nov. 11, 2021

Related U.S. Application Data

(60) Provisional application No. 63/005,056, filed on Apr. 3, 2020, provisional application No. 63/005,067, filed on Apr. 3, 2020, provisional application No. 63/004,274, filed on Apr. 2, 2020.

(51) Int. Cl.

| | |
|---|---|
| ***H01Q 9/04*** | (2006.01) |
| ***H01Q 5/314*** | (2015.01) |
| ***H01Q 13/10*** | (2006.01) |

(52) U.S. Cl.

CPC ........... *H01Q 9/0414* (2013.01); *H01Q 5/314* (2015.01); *H01Q 13/10* (2013.01)

(58) Field of Classification Search

CPC ......... H01Q 9/044; H01Q 5/314; H01Q 13/10

USPC .......................................................... 343/853

See application file for complete search history.

(56) References Cited

U.S. PATENT DOCUMENTS 10,686,486 B1 * 6/2020 Kanawati ................ H03F 3/195
11,217,890 B2 * 1/2022 Linn ...................... G01R 29/10

OTHER PUBLICATIONS

International Preliminary Report and Written Opinion on the Patentablility of Application No. PCT/US2021/025731 Mailed Oct. 13, 2022, 8 pages.

* cited by examiner

*Primary Examiner* — Peguy Jean Pierre

(74) *Attorney, Agent, or Firm* — Womble Bond Dickinson (US) LLP

(57) ABSTRACT

Routing and layout for an antenna are described. In one embodiment, the antenna comprises an aperture having a plurality of radio-frequency (RF) radiating antenna elements, wherein each antenna element of the plurality of RF radiating antenna elements comprises an iris slot opening and an electrode over the iris slot opening; a plurality of drive transistors coupled to the plurality of antenna elements; and a plurality of storage capacitors, each storage capacitor coupled to the electrode of one antenna element of the plurality of antenna elements. The aperture also comprises at least one of: the drive transistor for the one antenna element is located under the electrode of the antenna element, the storage capacitor for the one antenna element is located under the electrode of the antenna element, and the metal routing to the one antenna element for a first voltage overlaps, in an overlap region, a common voltage routing that routes the common voltage to the one antenna element to form a storage capacitance.

30 Claims, 21 Drawing Sheets

ROUTING AND LAYOUT IN AN ANTENNA

RELATED APPLICATION

The present application is a continuation of and claims the benefit 35 USC 119(e) of U.S. Provisional Patent Application No. 63/004,274 filed Apr. 2, 2020, U.S. Provisional Patent Application No. 63/005,067 filed Apr. 3, 2020, and U.S. Provisional Patent Application No. 63/005,056 filed Apr. 3, 2020, all of which are incorporated herein by reference in their entirety.

FIELD OF THE INVENTION

Embodiments of the present invention are related to wireless communication; more particularly, embodiments of the present invention are related to routing electrical lines, or traces, in an antenna (e.g., a satellite antenna).

BACKGROUND

Radio-frequency (RF) metamaterial antennas with multiple bands and/or operating at high frequencies, such as the Ka frequency band, require high densities of RF antenna elements. One type of metamaterial antenna uses liquid crystal (LC)-based RF radiating metamaterial antenna elements. These antenna elements can be controlled or driven by an active matrix drive. In some implementations, one transistor is coupled to each LC-based RF metamaterial antenna element and is used to turn on or off the antenna element by applying a voltage to a select signal coupled to the gate of the transistor. Many different types of transistors may be used, including thin-film transistors (TFT). In this case, the active matrix is referred to as a TFT active matrix.

The active matrix uses addresses and drive circuitry to control each LC-based RF metamaterial antenna element. To ensure each of the antenna elements are uniquely addressed, the matrix uses rows and columns of conductors to create connections for the selection transistors. Where the number of antenna elements is large, the number of rows and columns of conductors to control and drive the antenna elements may make routing of all the connections difficult.

RF metamaterial antennas often include a storage capacitor with the drive transistor. For example, when the drive transistor is a TFT, the RF metamaterial antennas would place many TFT/capacitor structures into the layout. When the RF antenna elements are laid out in rings, these TFT/capacitor structures consume much of the space between the rings of RF antenna elements. This space is needed to route signals to the RF antenna elements. However, in RF metamaterial antennas with higher densities of RF antenna elements, the amount of available area between RF antenna elements is reduced, which decreases the amount of space available for routing lines such as source, gate and drain lines for these structures and the drive transistors within them.

SUMMARY

Routing and layout for an antenna are described. In one embodiment, the antenna comprises an aperture having a plurality of radio-frequency (RF) radiating antenna elements, wherein each antenna element of the plurality of RF radiating antenna elements comprises an iris slot opening and an electrode over the iris slot opening; a plurality of drive transistors coupled to the plurality of antenna elements; and a plurality of storage capacitors, each storage capacitor coupled to the electrode of one antenna element of the plurality of antenna elements. The aperture also comprises at least one of: the drive transistor for the one antenna element is located under the electrode of the antenna element, the storage capacitor for the one antenna element is located under the electrode of the antenna element, and the metal routing to the one antenna element for a first voltage overlaps, in an overlap region, a common voltage routing that routes the common voltage to the one antenna element to form a storage capacitance.

In one embodiment, the antenna comprises: a plurality of radio-frequency (RF) radiating antenna elements, wherein each antenna element of the plurality of RF radiating antenna elements comprises an iris slot opening and an electrode over the iris slot opening; and a plurality of drive transistors, each drive transistor coupled to one antenna element of the plurality of antenna elements, wherein one or more metal routing lines between pairs of drive transistors is through one or more RF radiating antenna elements.

In one embodiment, the antenna comprises: a plurality of RF radiating antenna elements; and a plurality of structures coupled to the plurality of RF radiating antenna elements, each structure having a drive transistor coupled to a storage capacitor coupled to drive plurality of antenna elements, wherein each structure of the plurality of structures comprises a plurality of drain terminals.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
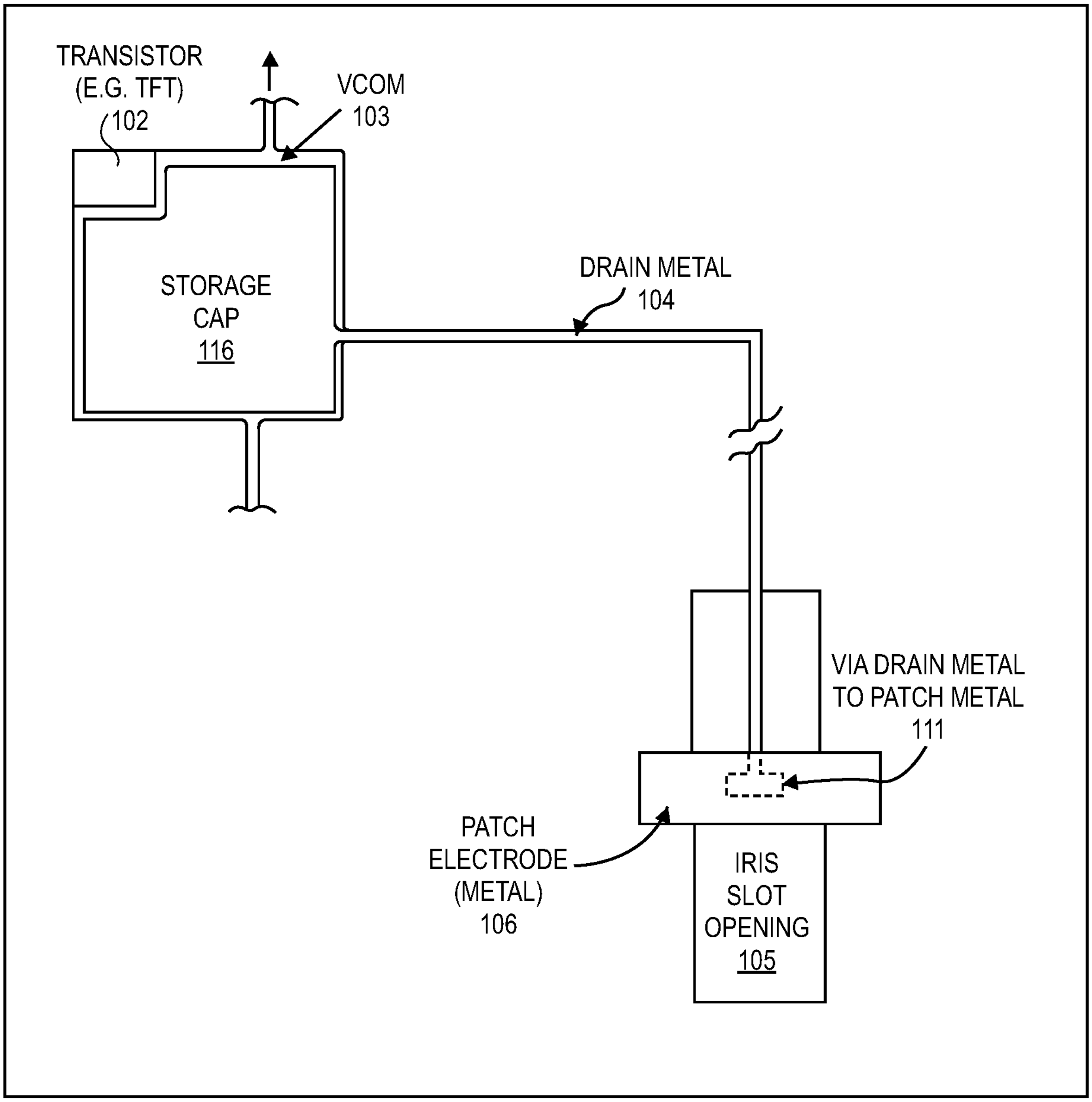
FIG. 1A illustrates one embodiment of an existing storage capacitor structure for an RF antenna element.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques for increasing the area available for routing electrical lines, or traces, in an antenna (e.g., satellite antenna) are disclosed. The terms "line" and "trace" will be used interchangeably throughout the specification. In one embodiment, the antenna has radio-frequency (RF) metamaterial antenna elements driven by a thin film transistor (TFT) that are part of a matrix drive. Examples of such antennas (e.g., electronically steerable antennas having liquid crystal (LC)-based metamaterial RF radiating antenna elements, etc.) are described in more detail below; however, the techniques described herein are not limited to such antennas and may be used in other antennas with other types of antenna elements (e.g., varactor-based antenna elements, MEMs-based antenna elements, etc.) that are controlled by other types of drive mechanisms and/or drive transistors.

In one embodiment, the area available for routing electrical lines (traces) is increased by placing the storage capacitor for a drive transistor-driven RF metamaterial antenna into previously unavailable or forbidden areas of the layout, such as the areas occupied by RF elements (i.e., the RF element area), in a way that does not degrade RF antenna performance. In one embodiment, this is accomplished by using the routing lines from the storage capacitor to the electrode (e.g., patch electrode) of an RF antenna element as part of the storage capacitance for the RF antenna element. This increases the area available for routing. In one embodiment, the routing lines are used as part of the storage capacitance for the RF antenna element by extending voltage routing lines above or below one another such that the voltage routing lines overlap. This overlap of voltage routing lines causes additional capacitance to be generated. In one embodiment, one voltage routing line can be positioned over the center of another voltage routing line. In one embodiment, the drain metal line from the drain of a drive transistor (e.g., TFT) for an antenna element overlaps (e.g., is above, is below) a common voltage (Vcom) routing line. The overlap does not have to extend for the whole length of the routing trace. In a design process, one can calculate the amount of capacitance that can be generated per unit length and then calculate the length of the overlap to reach a desired capacitance value. In one embodiment, the overlapping voltage routing lines are routed on a substrate (e.g., a patch substrate) of the antenna aperture and are separated from each other by one or more layers of material, such as a dielectric (e.g., passivation layer).

In another embodiment, the area available for routing electrical lines (traces) is increased by placing part, or all, of the storage capacitor under the electrode of the RF antenna element that is positioned and controls operation of an iris slot opening. In one embodiment, the electrode is a patch electrode of an iris/patch pair. In another embodiment, the electrode is a tunable dielectric device.

In one embodiment, the area available for routing electrical lines (traces) is increased by placing a drive transistor (e.g., TFT) of the RF antenna element under the electrode (e.g., the patch electrode) to increase the area available for routing.

The result of using these techniques is that the storage capacitor structures are placed in spaces that were formerly not used for storage capacitors and the size of the storage capacitor is reduced, thereby creating more room for routing in those areas.

In one embodiment, an antenna comprising an antenna aperture that has a plurality of radio-frequency (RF) radiating antenna elements. Each antenna element of the plurality of RF radiating antenna elements comprises an iris slot opening and an electrode over the iris slot opening. In one embodiment, the antenna aperture comprises a plurality of drive transistors (e.g., matrix drive transistors, etc.) and a plurality of storage capacitors coupled to the plurality of antenna elements. Each storage capacitor is coupled to the electrode of one of the antenna element. In one embodiment, the aperture also includes one or more of the following:

1) the drive transistor for the one antenna element is located under the electrode (e.g., patch electrode, etc.) of the antenna element, 2) the storage capacitor for the one antenna element is located under the electrode of the antenna element, and 3) the metal routing to the one antenna element for a first voltage overlaps, in an overlap region, a second voltage routing (e.g., a common voltage routing, etc.) that routes the second voltage to the one antenna element, when the two overlap, thereby forming a storage capacitance.

FIG. 1A illustrates one embodiment of an existing storage capacity structure for an RF antenna element. Referring to FIG. 1A, a driving transistor/capacitor structure contains storage capacitor 101 and a transistor (e.g., a thin film transistor (TFT), etc.) 102. In one embodiment, storage capacitor 101 and transistor 102 are connected through a metal trace on a source routing layer. A common voltage (Vcom) routing 103 is coupled to storage capacitor 101 and transistor 102. An antenna element is coupled to the transistor/capacitor structure and comprises an iris slot opening 105 and a patch electrode 106 (e.g., patch metal) is positioned across iris slot opening 105. Drain metal routing line 104 is coupled to the drain of transistor 102 is coupled to storage capacitor 101, as well as to patch electrode 106 using one or more vias 111. In one embodiment, both source and drain are patterned on the same metal layer, with source lines connecting the TFT source terminals to the driver integrated circuit and drain lines connecting the TFT drain terminals to the storage capacitor and patch.

Figure 1B:
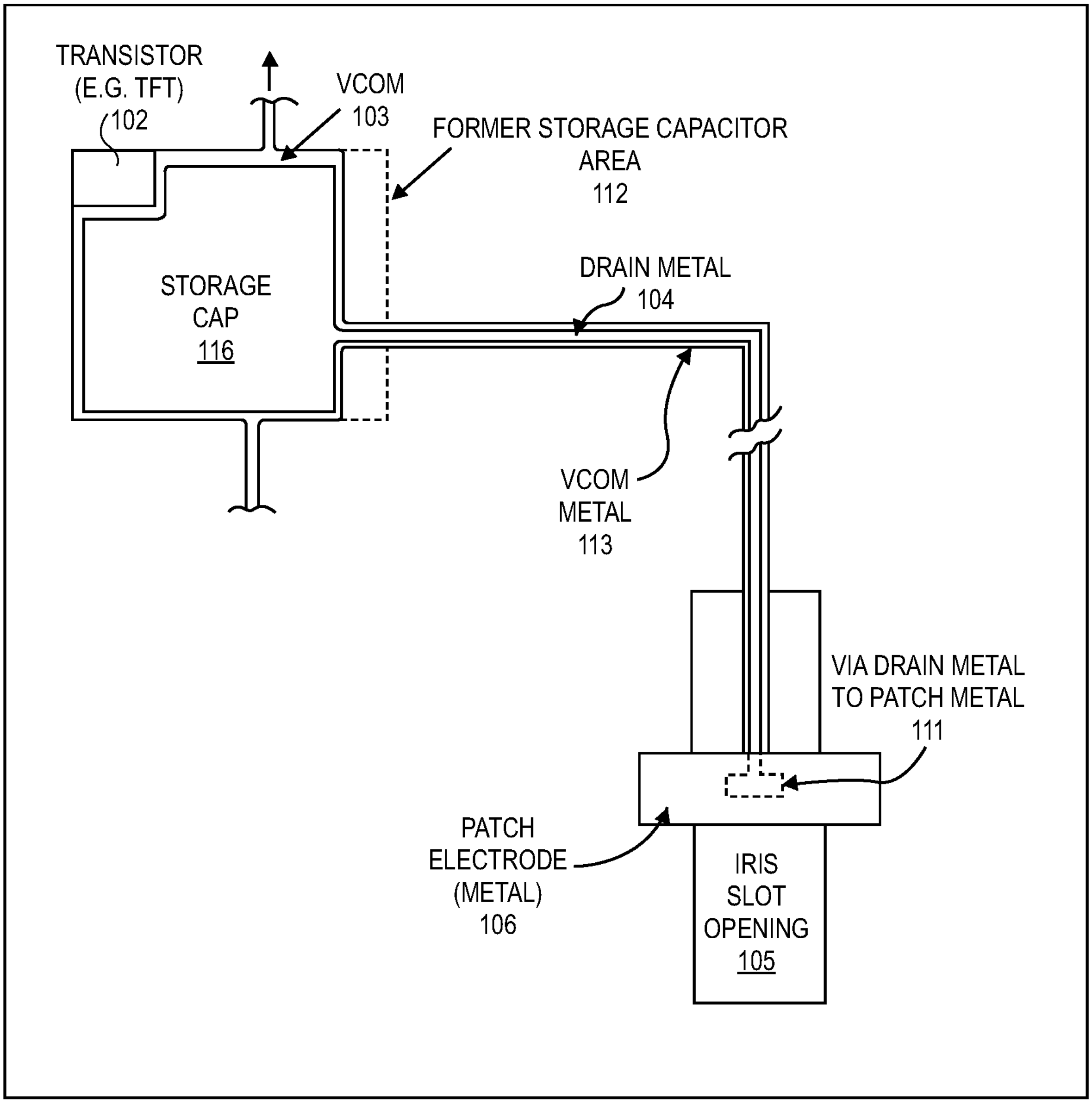
FIG. 1B illustrates one embodiment of a layout of an antenna element and a driving transistor/storage capacitor structure.

FIG. 1B illustrates one embodiment of a layout of an antenna element and a driving transistor/storage capacitor structure. The illustrated arrangement provides additional capacitance by extending the Vcom routing line beneath the drain metal routing line so that the two overlap. In one embodiment, these are separated by a passivation layer between those metal layers. In one embodiment, a dielectric material is used as the passivation layer. In one embodiment, the amount of separation between two electrodes depends on multiple things such as, for example, but not limited to, process capabilities for dielectric materials, dielectric material properties, TFT array size, TFT array refresh frequency. Note that 0.1-0.3 um thick dielectric layers are commonly used in LCDs. The additional capacitance provided by this arrangement allows the storage capacitor of the driving transistor/storage capacitor structure to be smaller than if the Vcom routing line and drain metal routing line did not overlap.

Referring to FIG. 1B, the driving transistor/storage capacitor structure comprises storage capacitor 115 and transistor 102. In one embodiment, transistor 102 is a TFT. However, in alternative embodiments, transistor 102 is another type of drive transistor. Because of the capacitance produced by overlapping the voltage routing lines, storage capacitor 115 is smaller than storage capacitor 101 of FIG. 1A, the outline of which is provided in FIG. 1B as former storage capacitor area 112.

The driving transistor/storage capacitor structure is coupled to the Vcom routing line 113. Vcom routing line 113 is a metal trace that runs beneath drain metal routing line 104 and follows the drain metal line 104 to its connection to patch electrode 106 using one or more vias 111. Thus, Vcom routing line 113 overlaps drain metal routing line 104 from driving transistor/storage capacitor structure to its connection to patch electrode (e.g., patch metal) 106. In an alternative embodiment, Vcom metal routing line 113 is above drain metal routing line 104. As described above, the overlapping of voltage routing lines provides additional capacitance which means that storage capacitor 115 can be smaller than the traditional storage capacitance such as shown in FIG. 1A.

Figure 1C:
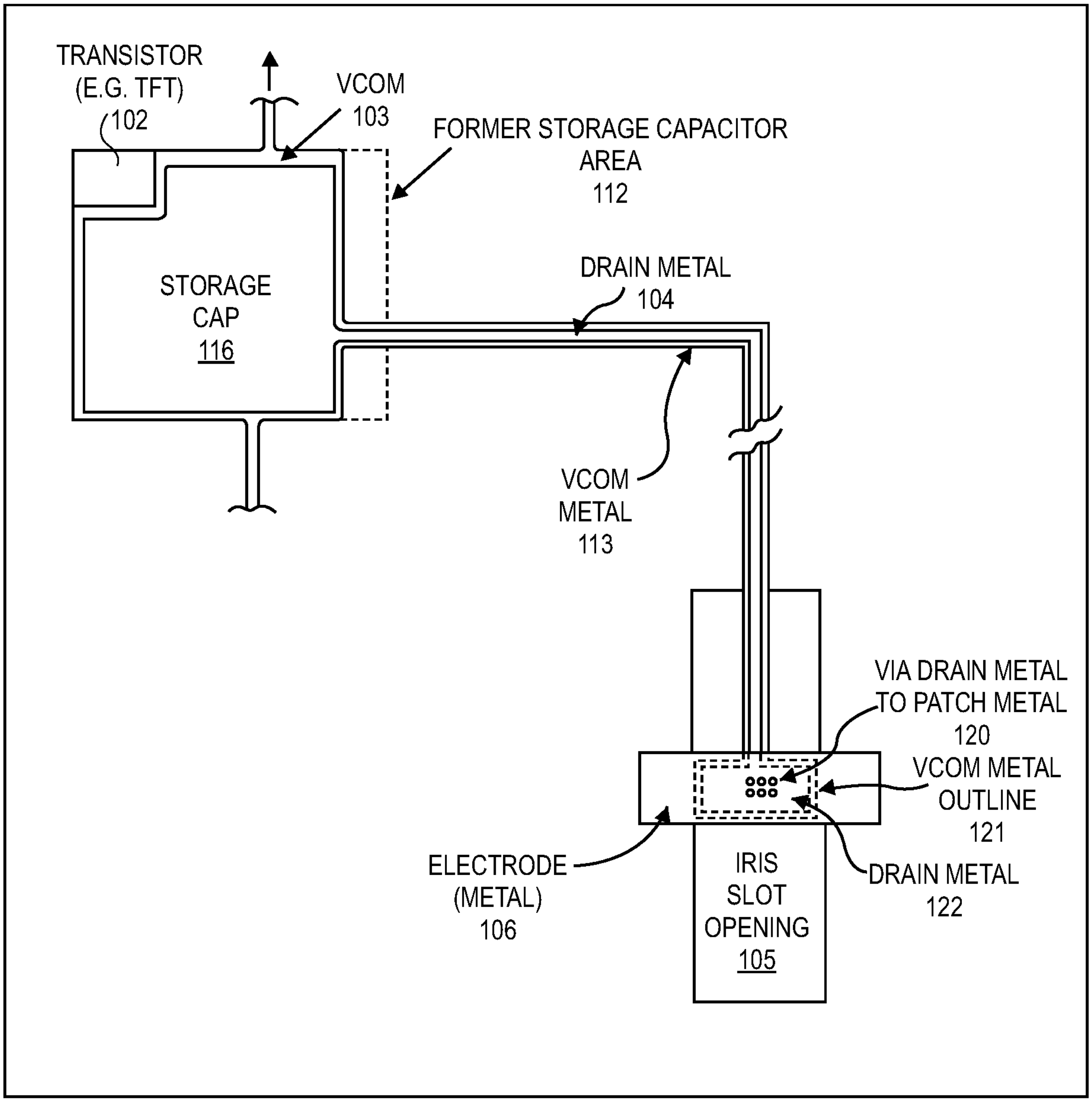
FIG. 1C illustrates another embodiment of a layout that extends a common voltage routing line beneath the source metal routing and uses source metal and common voltage metal overlap under a patch electrode.

FIG. 1C illustrates another arrangement that provides further capacitance by extending the Vcom routing line beneath the drain metal routing and by forming additional capacitance between the drain metal and Vcom metal underneath the patch electrode.

Referring to FIG. 1C, the driving transistor/storage capacitor structure comprises capacitor 116 and transistor 102 (e.g., TFT). Storage capacitor 116 can be smaller than storage capacitor 101 of FIG. 1A, the outline of which is shown as former storage capacitor area 112, because of the added capacitance provided by overlapping voltage routing lines and forming capacitance between Vcom metal and drain metal under electrode 106.

The driving transistor/storage capacitor structure is coupled to Vcom routing line 113. Vcom metal 113 overlaps drain metal 104 as in FIG. 1B, and both continue to patch electrode 106. Drain metal routing line 104 is coupled to patch electrode 106 using one or more vias 120.

Drain metal routing line 104 is connected to drain metal 122. Drain metal 122 is larger than the area of the drain metal that connects to patch electrode 106. In one embodiment, Vcom metal 121 is larger than, and extends beyond the sides of, drain metal 122 and forms a capacitance between Vcom metal 121 and drain metal 122. Even so, drain metal 122 and Vcom metal 121 will form a capacitance by occupying even a very small area. In that case, the capacitance will be very small. To obtain the desired capacitance, TFT array parameters are configured, and it can be all the way from, for example, 10×10 um to 600×600 um depending on the design. In one embodiment, the size (e.g., width) of overlap between Vcom metal 121 and drain metal 122 is larger under the electrode than outside of the electrode. The capacitance under patch electrode 106 due to the overlap of Vcom metal 121 and drain metal 122 can be adjusted by adjusting one or both sizes of the common voltage metal layer 121 and the drain metal layer 122.

In one embodiment, the drive transistor (e.g., a TFT) for the one antenna element is located under the electrode (e.g., patch electrode) of the antenna element while the storage capacitor for the one antenna element remains outside of the electrode area. That is, the transistor used for controlling the antenna element such as with a TFT that is part of a direct matrix drive control system is placed into the patch electrode area. This results in an increase in the area available for routing.

Figure 2A:
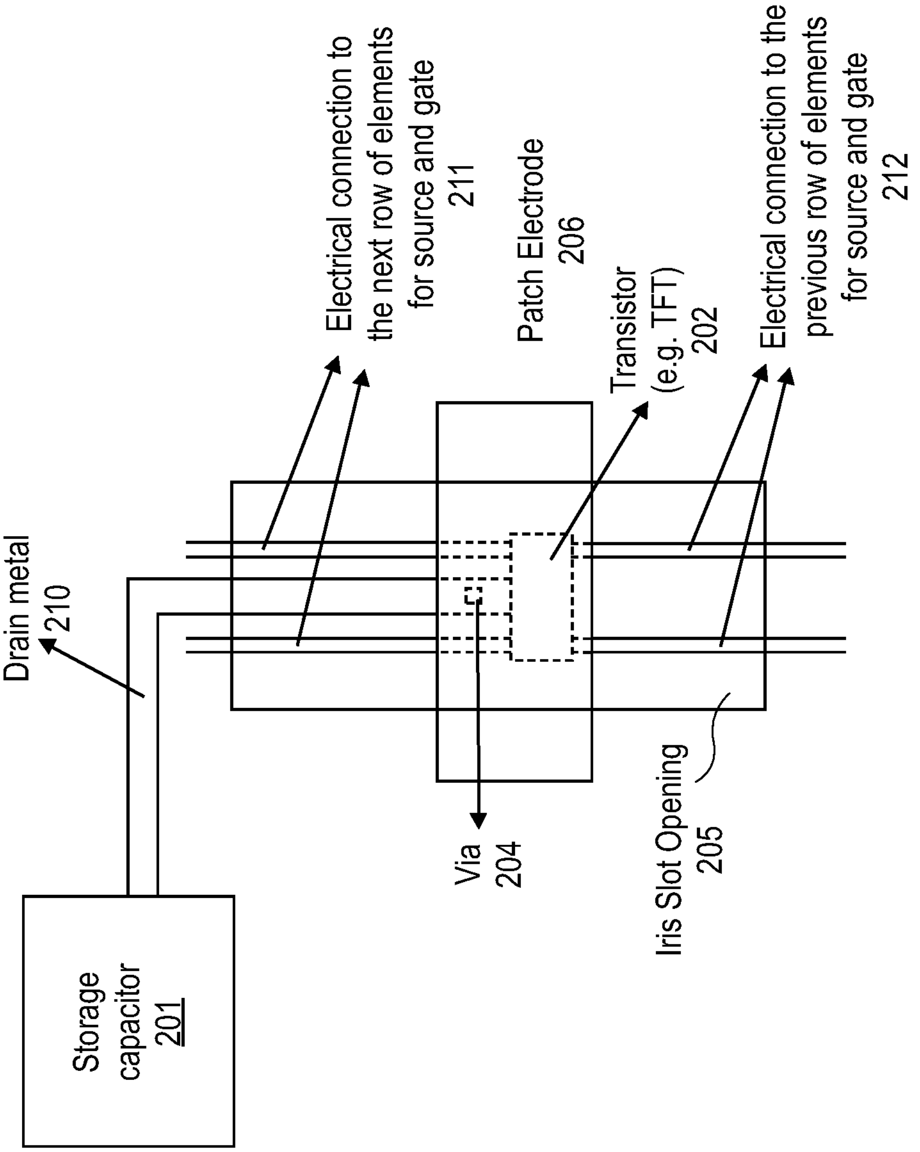
FIG. 2A illustrates one embodiment of a portion of antenna aperture having an antenna element with the driving transistor located in the electrode area.

FIG. 2A illustrates one embodiment of a portion of antenna aperture having an antenna element with the driving transistor located in the electrode area (e.g., patch electrode area). Referring to FIG. 2A, storage capacitor 201 is coupled to patch electrode 206 via drain metal routing line 210 using via 204. Transistor 202 (e.g., TFT) is placed in the area occupied by patch electrode 206, which is positioned over iris slot opening 205.

In one embodiment, patch electrode 206 is part of a patch structure having a patch and a patch substrate, and transistor 202 is formed underneath patch electrode 206 and resides between a patch substrate and a patch metal layer attached to the patch structure.

Transistor 202 is coupled to electrode connections 211 of the next row of drive transistors for antenna elements and electrode connections 212 of the previous row of drive transistors for antenna element.

Figure 2B:
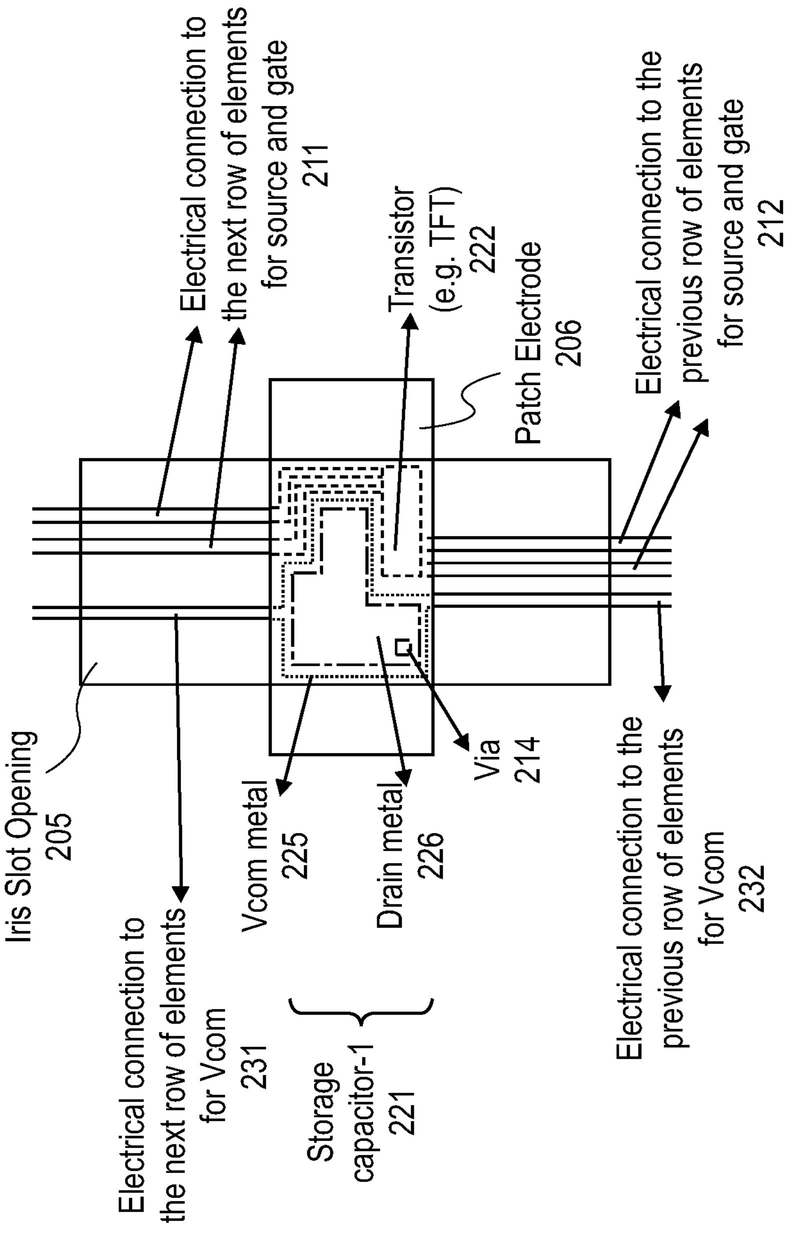
FIG. 2B illustrates one embodiment of an antenna element with a drive transistor and storage capacitor located in the electrode area.

In one embodiment, both the drive transistor and storage capacitor are moved into the electrode area (e.g., patch electrode area). FIG. 2B illustrates one embodiment of an antenna element with a drive transistor and storage capacitor located in the electrode area (e.g., patch electrode area). Referring to FIG. 2B, patch electrode 206 is positioned over iris slot opening 205. Drive transistor 222 (e.g., TFT) is within the area of patch electrode 206 along with storage capacitor 221. In one embodiment, both drive transistor 222 and storage capacitor 221 are located under patch electrode 206. In one embodiment, patch electrode 206 is part of a patch structure having a patch and a patch substrate, and drive transistor 222 and storage capacitor 221 are formed underneath patch electrode 206 and reside between a patch substrate and a patch metal layer attached to the patch structure.

Vcom metal 225 is coupled to storage capacitor 221. Drain metal 226 couples storage capacitor 221 to patch electrode 206 using via 214.

Figure 2C:
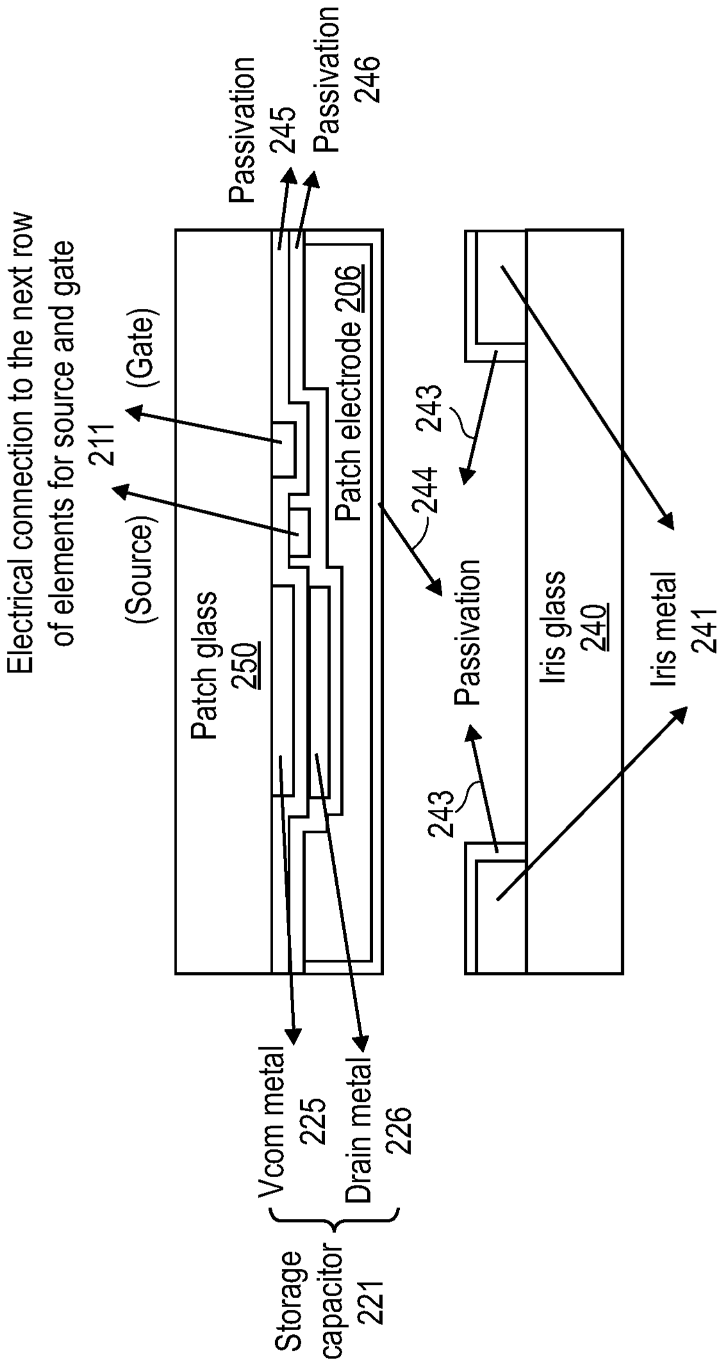
FIG. 2C illustrates a side section view of one embodiment of an antenna element shown in FIG. 2B with a drive transistor and storage capacitor located in the electrode area.

Transistor 222 and patch electrode 206 are separated using passivation layers (not shown in FIG. 2B). FIG. 2C is a side section view of FIG. 2B. Electrical connections 211 include the source electrode and the gate electrode for transistor 222. The source electrode is between passivation layers 245 and 246 of FIG. 2C, where passivation layer 245 is the gate insulator layer. In one embodiment, the active region (e.g., a-Si) of transistor 222 isn't shown in FIG. 2C, but it will be between passivation layers 245 and 246. Passivation layer 245 is a dielectric material that separates transistor 222 (e.g., TFT) related layers from patch electrode 206.

In one embodiment, the drive transistor and a first storage capacitor for the one antenna element is located under the electrode of the antenna element, while a second storage capacitor for the antenna element is located outside of the electrode of the antenna element. The first and second storage capacitors provide the capacitance for the drive transistor.

Figure 2D:
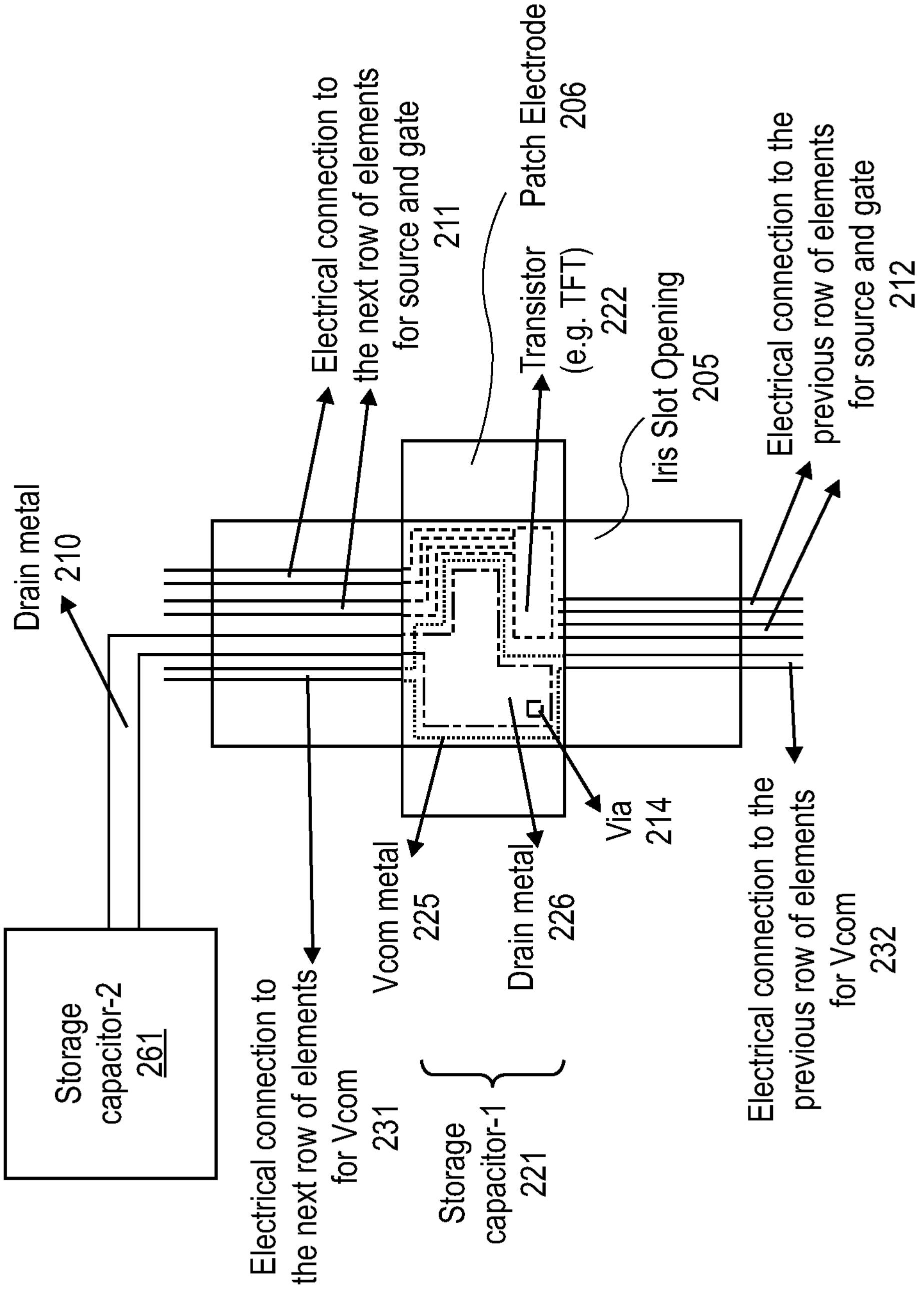
FIG. 2D illustrates one embodiment of the drive transistor and part of the storage capacitor moved into the electrode area.

FIG. 2D illustrates one embodiment of the drive transistor and part of the storage capacitor moved into the electrode area (e.g., patch electrode area). Referring to FIG. 2D, storage capacitor-2 231 is coupled via drain metal 210 to patch electrode 206, which is positioned over iris slot opening 205. Drive transistor 222 (e.g., TFT) and storage capacitor-1 221 are located in the area of patch electrode 206. In one embodiment, patch electrode 206 is part of a patch structure having a patch and a patch substrate, and drive transistor 222 and storage capacitor-1 221 are formed underneath patch electrode 206 and reside between a patch substrate and a patch metal layer attached to the patch structure, while storage capacitor-2 261 is outside of the area of patch electrode 206.

Vcom metal 225 is coupled to storage capacitor-1 221 and drain metal 226 is coupled to patch electrode 206 using one or more vias 214. Vcom metal 225 is also coupled to electrical connections 231 to the Vcom of next row of driver transistors for antenna elements and electrical connections 232 to the Vcom of the previous row of driver transistors for antenna element. Transistor 222 is coupled to electrical connections 211 to the source and gate of next row of driver transistors for antenna elements and electrical connections 212 to the source and gate of the previous row of driver transistors for antenna element.

Techniques described herein use space previously unused for routing traces by creating structures that allow routing traces through the RF elements without causing it degradation in performance. In one embodiment, parallel routing traces can be used to increase the other available area for routing electrical traces without degrading RF antenna performance.

In one embodiment, the area available for routing electrical traces is increased by reallocating areas used in individual RF antenna elements in an antenna (e.g., an RF metamaterial antenna) that were previously unavailable or forbidden areas, such as RF antenna element areas, without degrading RF antenna performance. In other words, space previously unused for routing traces can be used by creating structures that allow routing traces through the RF elements.

For example, the area available for routing electrical traces is increased by one or more of:

1) placing routing trace structures through RF antenna elements along the major axis of the RF element;

2) reducing the parasitic capacitance of the patch electrode with the routing structures by, for example, increasing the distance between metal layer of the parasitic capacitances and/or changing the permittivity of the dielectric materials of the parasitic capacitances;

3) changing the connection to the patch electrode to enable routing; and/or 4) adding an additional metal layer to assist in routing through the RF element.

Figure 3B:
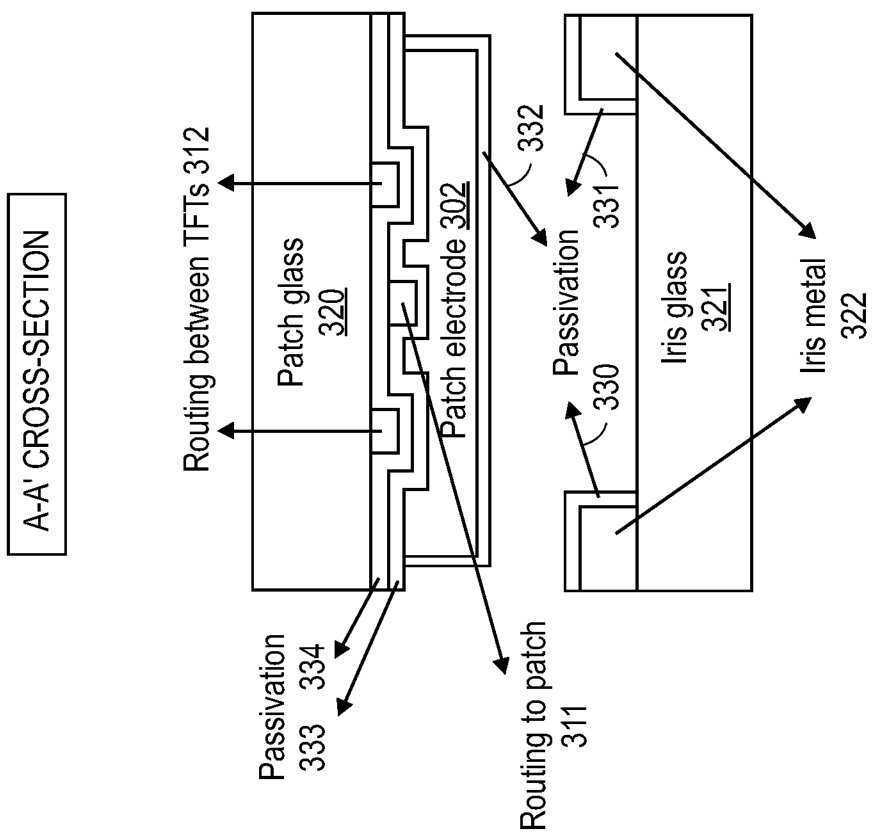
FIGS. 3A and 3B illustrate an example of an RF element with parallel routing traces along a major axis.
Figure 3A:
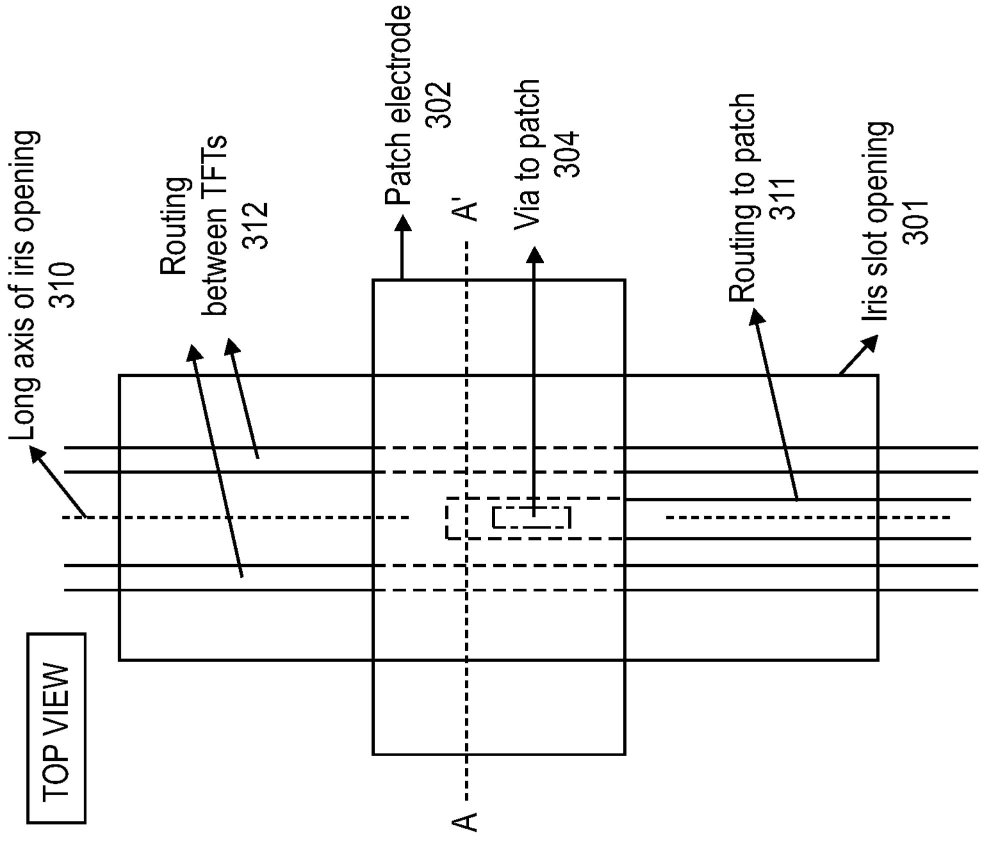

FIGS. 3A and 3B illustrate an example of an RF element with parallel routing traces along a major axis. In one embodiment, the major axis is the one through the iris slot opening. In one embodiment, traces are symmetric with respect to the major axis. In one embodiment, the traces are in the gate metal layer. In alternative embodiments, the traces are in the source metal layer or in both the gate and source metal layers.

Referring to FIG. 3A, iris slot opening 301 has an axis 310 that extends along the longer portion of iris slot opening 301. Routing traces 312 provides routing between the drive transistors (e.g., TFTs) and run parallel to the long axis of iris opening 301. This does not prevent routing 311 of the drain metal voltage that is coupled to patch electrode using one or more vias 304.

FIG. 3B represents the cross-sectional view of an RF element with the parallel routing traces of FIG. 3A. The cross-sectional view is taken along the A-A' axis that is shown in FIG. 3A. Referring to FIG. 3B, patch electrode 302 is shown surrounded by passivation layer 332 and passivation layers 333 and 334. Between passivation layers 333 and 334 is routing 311 to patch that routes the drain voltage to patch electrode 302 using one or more vias 304 (as shown in FIG. 3A). Passivation layers 333 and 334 along with the routing lines 312 between transistors is attached to patch glass 320. That is, routing lines 312 that runs between drive transistors of different antenna elements is attached to patch glass 320 and is located between patch glass 320 and patch electrode 302. In one embodiment, one or more routing lines 312 comprises parallel metal routing lines, symmetric with respect to the major axis of the at least one RF element. In one embodiment, routing 312 and 311 are the electrodes of the capacitor and passivation layer 334 is the dielectric separating them.

Also shown in FIG. 3B is iris glass 321 with iris metal 322 attached to iris glass 321. Iris metal 322 is covered by passivation layers 330 and 331.

In alternative embodiments, the antenna element includes a tunable dielectric device over iris slot opening 301 instead of a patch. In such a case, routing 312 is between transistors (e.g., PMOS, GaAs, etc.) that control or drive other antenna elements in the antenna aperture.

In one embodiment, layer thickness and permittivity of routing passivation can be changed to reduce parasitic capacitance between the routing lines such as routing lines 312 and patch electrode 302. In one embodiment, the thickness of passivation layers 333 and 334 is increased (e.g., 5-10 microns) to reduce the parasitic capacitance. In one embodiment, the permittivity of the passivation is decreased (e.g., 0.2-0.03) to reduce the parasitic capacitance. The material may also be changed to Silicon Dioxide, Silicon OxyNitride, an organic (e.g., polyimide), etc.

In one embodiment, a new metal layer is added between the patch glass and the gate metal layer. Furthermore, a new passivation layer is also added between the new metal layer and the gate metal layer. This increased passivation layer stack reduces the parasitic capacity between the patch electrode and the routing lines.

Figure 3C:
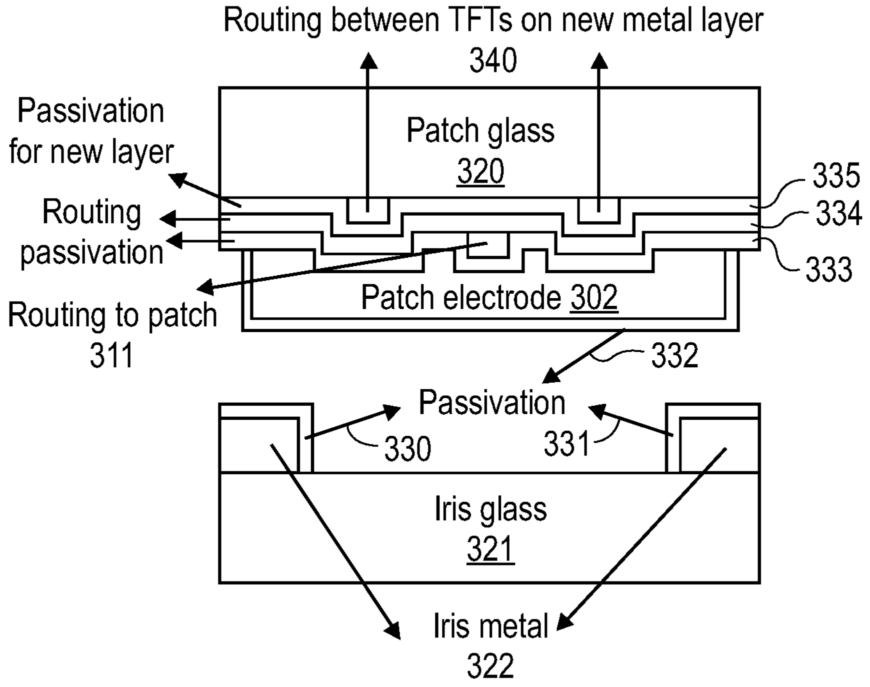
FIG. 3C illustrates an example of the use of a new metal layer and added passivation layer in an RF antenna element.

FIG. 3C illustrates an example of the use of a new metal layer and added passivation layer. Routing 340 between the drive transistors (e.g., TFT) of antenna elements occurs on a new metal layer. The new metal layer for routing 340 and passivation layer (335) are added below the gate metal layer (312 in FIG. 3B). The new passivation layer 335 is shown over routing layer 340 for routing between TFTs while routing passivation layer 333 and passivation layer 334 are on top of passivation layer 335. The new passivation layer 335 operates as a dielectric between patch electrode 302 and metal routing lines to reduce the parasitic capacitance between patch electrode 302 and the metal routing lines.

In one embodiment, the patch electrode can be extended outside the iris slot opening to move the via that couples the drain metal to the patch electrode outside of the area of the iris slot opening. In one embodiment, trace widths for routing lines are thinned in the area of the patch electrode to reduce the parasitic capacitance. The thinning can be done so as to not increase the resistance to where it detrimentally impacts operation of the antenna element.

Figure 4:
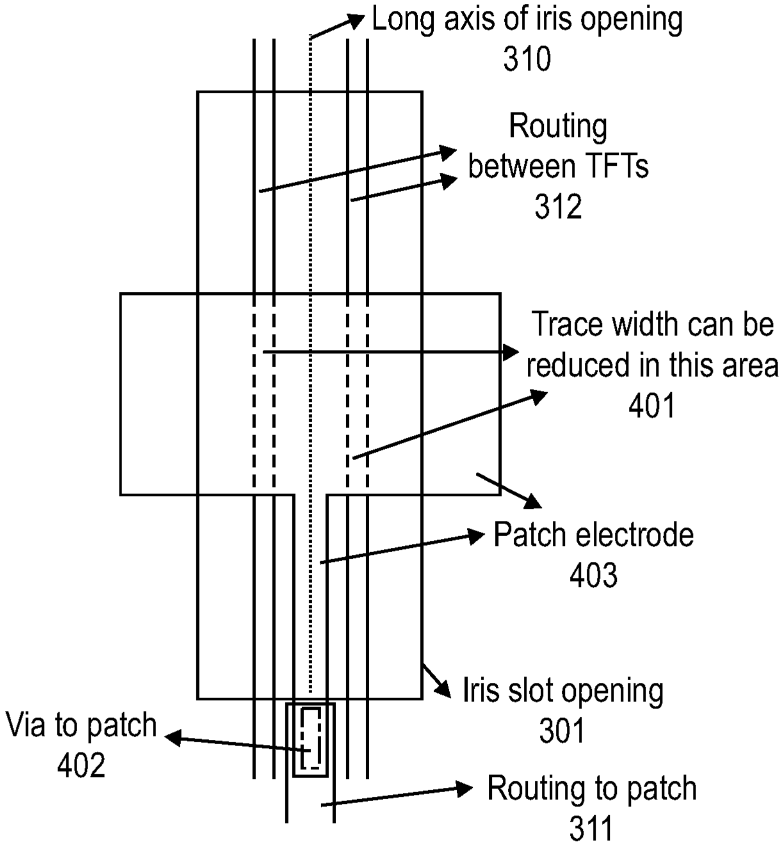
FIG. 4 illustrates the example in which the patch electrode is extended outside the iris slot opening.

FIG. 4 illustrates the example in which the patch electrode is extended outside the iris slot opening. Referring to FIG. 4, the patch electrode 403 includes an extension that extends past iris slot opening 301 to via 402 which couples routing 311 to patch electrode 403. Moving the via 402 outside of the area for patch electrode 302 reduces parasitic capacitance.

In one embodiment, the wire routing to and from the drive transistor/storage capacitor structure is modified in comparison to the designs in FIGS. 1A-1C. In one embodiment, the modifications involve the drive transistor box (e.g., TFT) and are based on the position and the rotation of nearby RF antenna elements to enhance placement of gate, source, Vcom and drain routing of the structure. Such designs differ from the current state of the art by the directions by which the source and gate lines enter and leave the drive transistor box (area reserved for transistor and if needed a storage capacitor), the position and rotation of the TFT within the transistor box, and direction of the exit of the drain from the transistor box. In one embodiment, the transistor boxes are rotated to improve, and potentially optimize, connection locations with respect to the local RF element geometries.

In one embodiment, drain routing from the drive transistor/storage capacitor structure exits in multiple directions from the structure. In one embodiment, drain routing from the drive transistor/storage capacitor structure exits to connect RF elements on different rings of antenna elements. Examples of antenna rings are described in greater detail below. The rings may be a ring with a larger radius or a smaller radius.

In one embodiment, the drain line may cross the gate line adding some parasitic capacitance. In one embodiment, drain routing from the drive transistor/storage capacitor structure exits the structure opposite the source line. In one embodiment, an algorithm is used to select the drain location to which to connect.

Figure 5A:
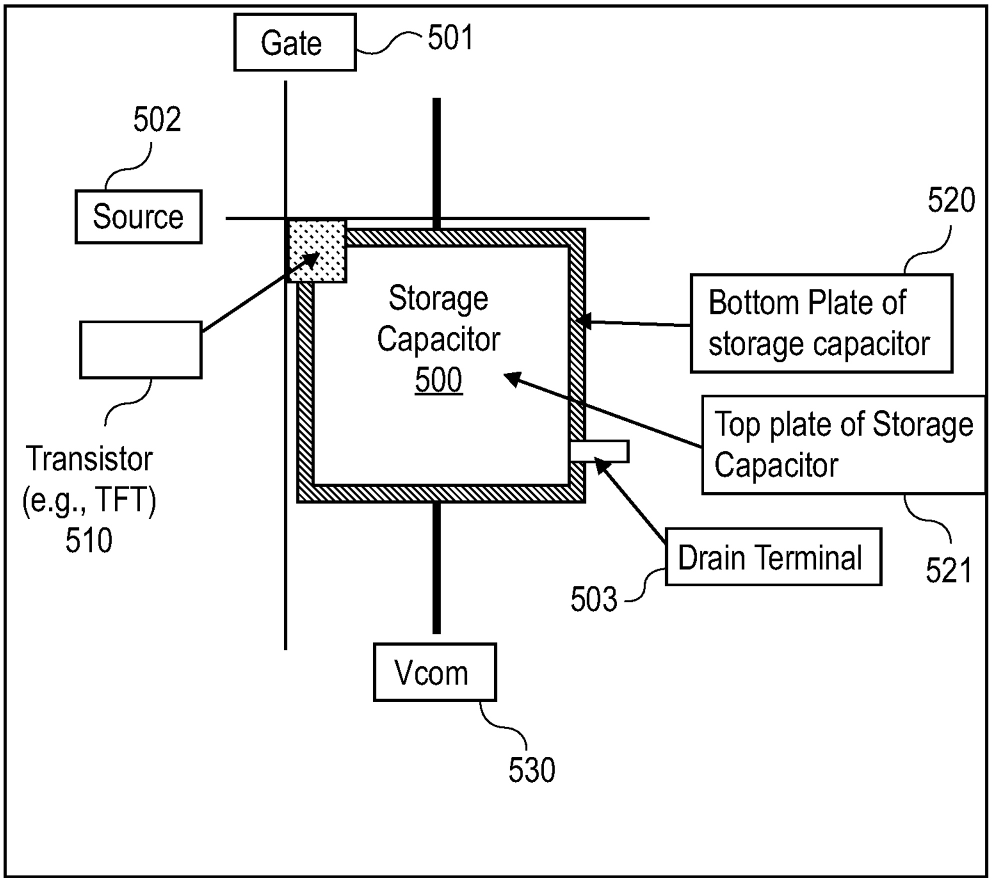
FIG. 5A illustrates one embodiment of a structure having contained the drive transistor (e.g., TFT) as part of the matrix drive control system and a storage capacitor.

FIG. 5A illustrates one embodiment of a structure having contained the drive transistor (e.g., TFT) as part of the matrix drive control system and a storage capacitor. Referring to FIG. 5A, transistor 510 (e.g., a TFT) is located with storage capacitor 500 that includes the bottom plate 520 and top plate 521. Gate 501 and source 502 are coupled to transistor 510 and storage capacitor 500. In one embodiment, storage capacitor 500 includes drain terminal 503. Storage capacitor 500 is coupled to Vcom 530.

In one embodiment, the antenna comprises a plurality of RF radiating antenna elements (e.g., metamaterial antenna elements) and a plurality of structures coupled to the plurality of RF radiating antenna elements. Each structure has a drive transistor (e.g., a TFT) coupled to a storage capacitor to drive plurality of antenna elements. In one embodiment, each structure of the plurality of structures comprises a plurality of drain terminals.

Figure 5B:
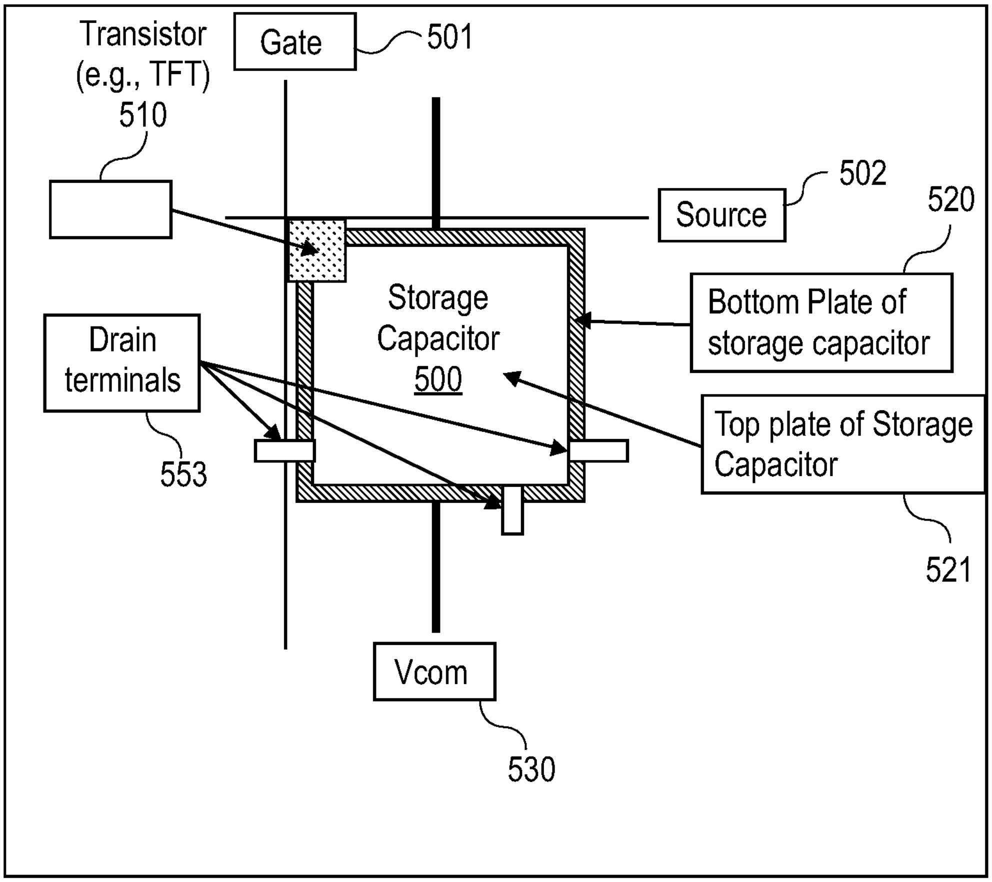
FIG. 5B illustrates structure of a drive transistor/storage capacitor structure with multiple drain connections.

FIG. 5B illustrates structure of a drive transistor/storage capacitor structure with multiple drain connections. Referring to FIG. 5B, gate 501 and source 502 are coupled to transistor 510 (e.g., TFT, etc.) and storage capacitor 500. In one embodiment, storage capacitor 500 includes 3 drain terminals 540 exiting storage capacitor 500. Each of the drain terminals of drain terminals 540 may be coupled to an RF antenna element. Storage capacitor 500 is coupled to Vcom 530.

In one embodiment, in the drive transistor/storage capacitor structure, positions of the gate metal line and source metal line are exchanged such that the drain line exits the storage capacitor to the left of the gate and Vcom metal lines. In one embodiment, this occurs without having the drain line cross the source metal line.

Figure 5C:
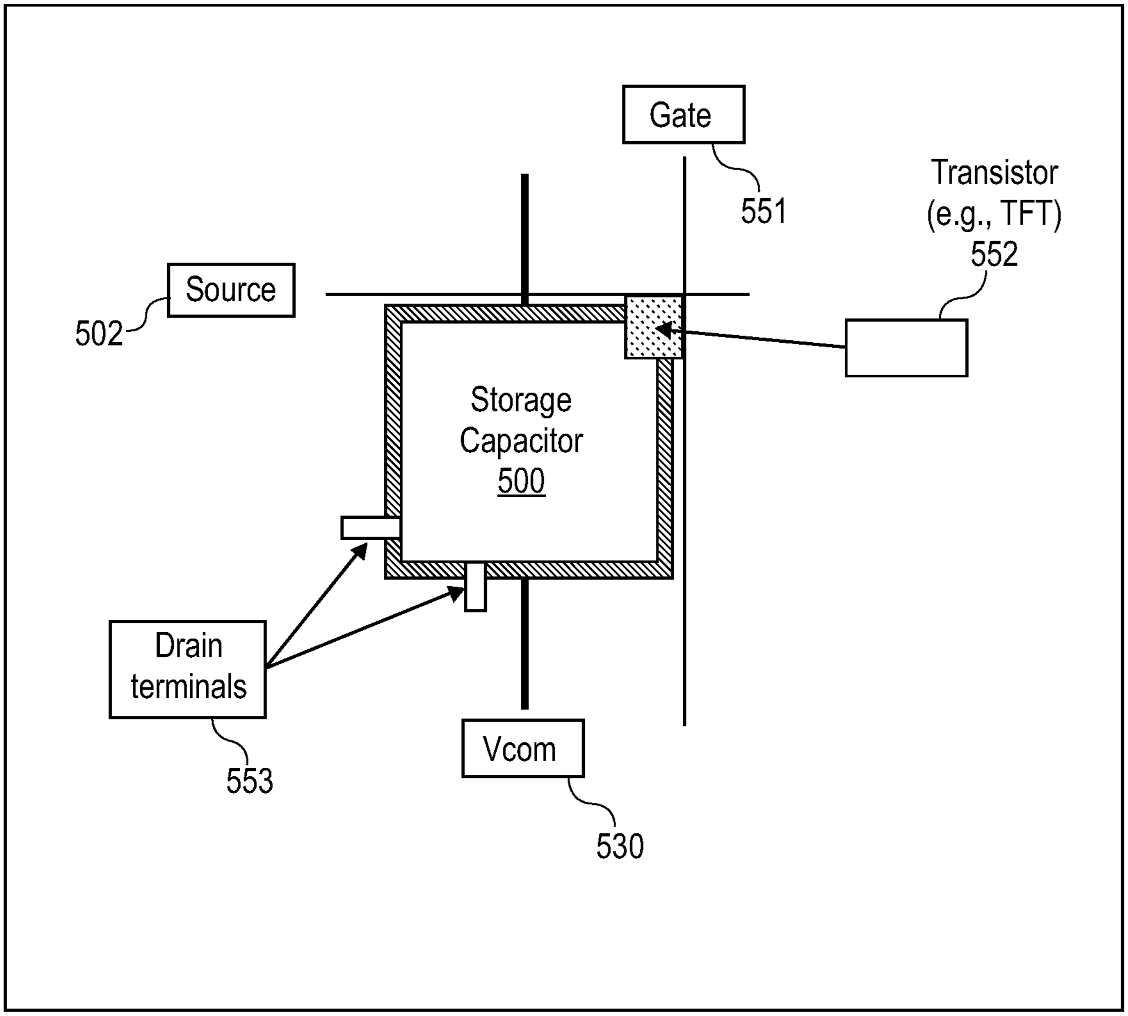
FIG. 5C illustrates one embodiment of the drive transistor/storage capacitor structure having reverse drain and gate positions.

FIG. 5C illustrates one embodiment of the drive transistor/storage capacitor structure having reverse drain and gate positions. Referring to FIG. 5C, drain terminals 553 are located left of gate signal 551 so that voltages on the drain do not cross the gate signal. This allows multiple configurations to be used in the routing depending on the layout of antenna elements and gate and source lines.

Based on the placement of the routing lines, it may be advantageous to rotate the storage capacitor for the RF antenna element. This may simplify routing. In one embodiment, drive transistor/storage capacitor structure is rotated in comparison to its position in figures described above to better accept preferred routing direction and to simplify routing placement algorithms. In one embodiment, one or more connection locations for routing lines of the drive transistor/storage capacitor structure are rotated to align with routing that runs with the tangent to the local ring of elements. In one embodiment, one or more connections for routing lines of the drive transistor/storage capacitor structure are rotated to align with routing that runs across the tangent of the local ring of element.

Figure 5D:
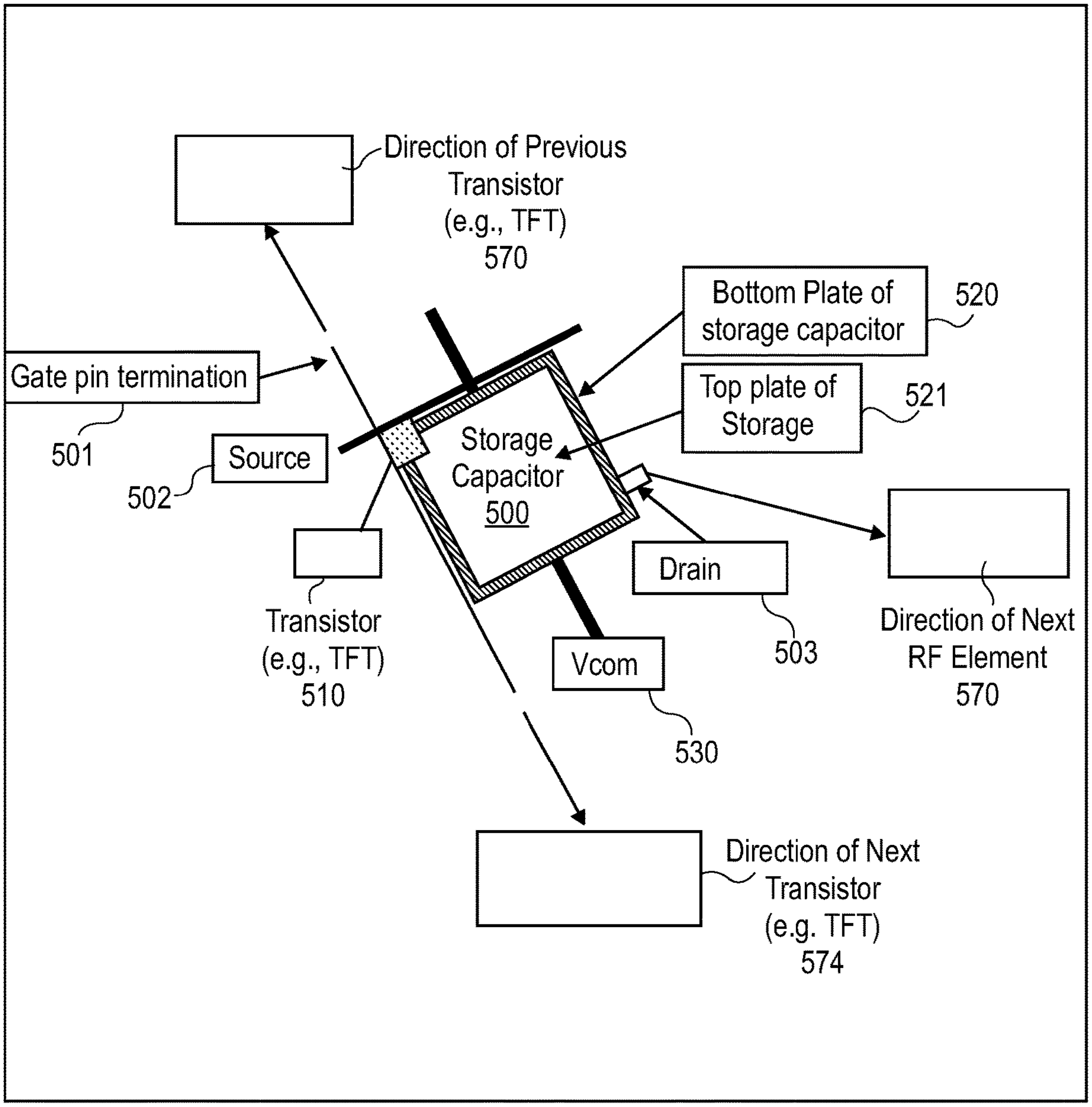
FIG. 5D illustrates in one embodiment of a rotated drive transistor/storage capacitor structure.

FIG. 5D illustrates in one embodiment of a rotated drive transistor/storage capacitor structure. Referring to FIG. 5D, the storage capacitor 500 is the same as storage capacitor in FIG. 5A excepts is position is rotated in the direction of the previous drive transistor 570 and the direction of the next drive transistor 571. In this case, drain 503 is in the direction of next RF antenna element. This next RF element may be in a ring of antenna elements next to the antenna element corresponding to storage capacitor 500. The ring can have a larger radius than the ring of the antenna element associated with storage capacitor 500 or in a ring having a smaller radius than the ring of the antenna element associated with storage capacitor 500.

Also shown are gate 501 and source 502.

An Example Algorithm for Using TFT Box with Multiple Terminal Locations

In one embodiment, a process looks for areas where there is not enough space at the ends of the RF elements to place drive transistor/storage capacitor structures for every drive transistor element (e.g., TFT) in the local area. In one embodiment, this is accomplished by checking to determine if there is space in the next smaller radius ring or next largest radius ring to place the drive transistor/storage capacitor structure. If there is space, the logic places the drive transistor/storage capacitor structure and chooses which drain terminal to connect to the drive transistor (e.g., TFT element).

An Example Algorithm for Using Mirror Image (from Current Drive Transistor/Storage Capacitor Structures)

In one embodiment, a process compares the difficulty in routing between two rings of antenna elements. In one embodiment, this comparison is made by measuring, for example, whether the optimal drive transistor/storage capacitor structure would have more drains that can route to the right or more drains that could route to the left. In one embodiment, if the optimal routing for a ring would be to use the mirror image structure, where positions of routing for the gate metal and drain are a mirror image drive transistor/storage capacitor structure is used.

An Example Algorithm for Using Rotated Placement of Drive Transistor/Storage Capacitor Structures Due to the placement of RF elements in rings, in one embodiment, routing between the rings changes directions throughout the layout. In one embodiment, multiple bends in the routing may be required to connect the current drive transistor/storage capacitor structure with its single fixed orientation. In one embodiment, an algorithm for placing drive transistor/storage capacitor structures in a rotated manner includes looking at the local directions of the routing and the RF elements and calculating the rotation of the drive transistor/storage capacitor structures that reduces, and potentially minimizes, the length of the routing required to the connect a drive transistor/storage capacitor structures to adjacent drive transistor/storage capacitor structures and to its target RF element.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas.

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
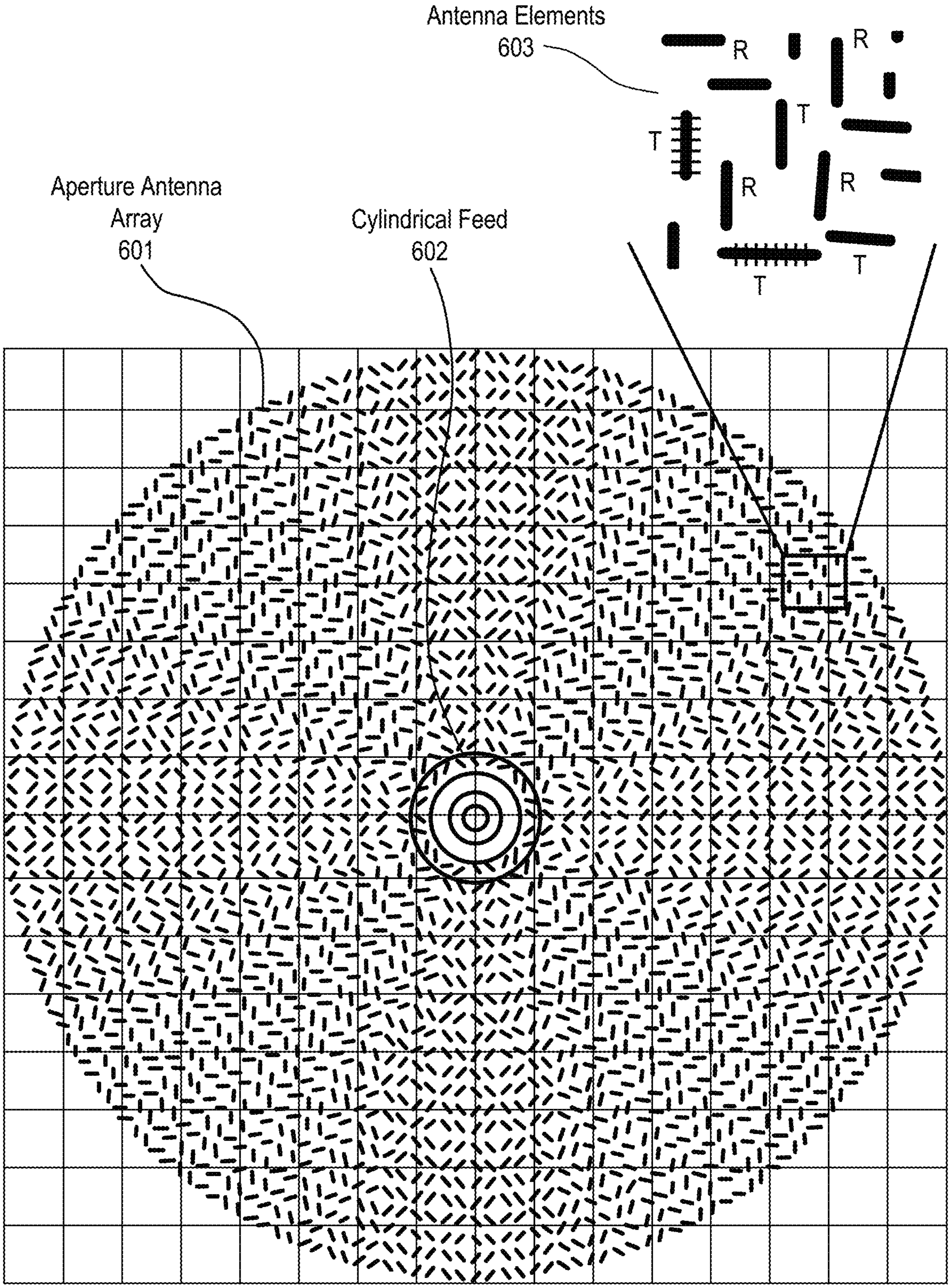
FIG. 6 illustrates an aperture having one or more arrays of antenna elements placed in concentric rings around an input feed of the cylindrically fed antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
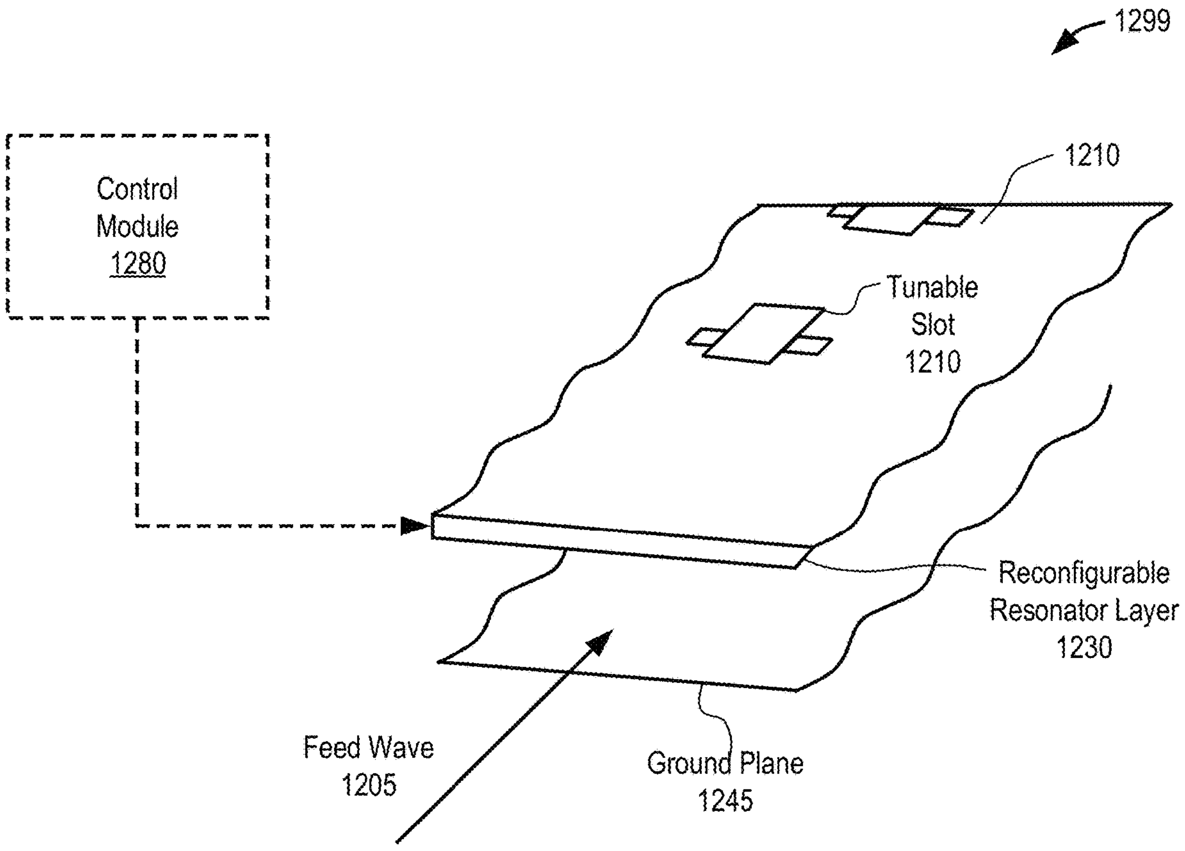
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
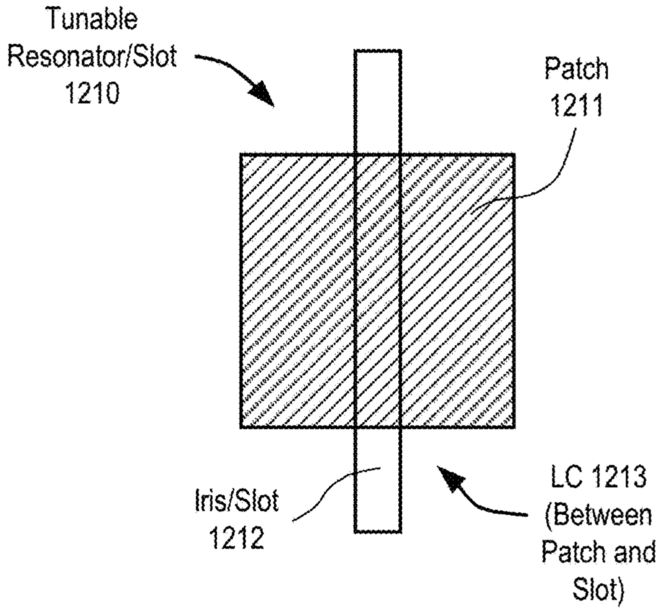
FIG. 8A illustrates one embodiment of a tunable resonator/slot.

Control module 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each Figure, a control module similar to control module 1280 may drive each array of tunable slots described in the Figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}{}^*w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
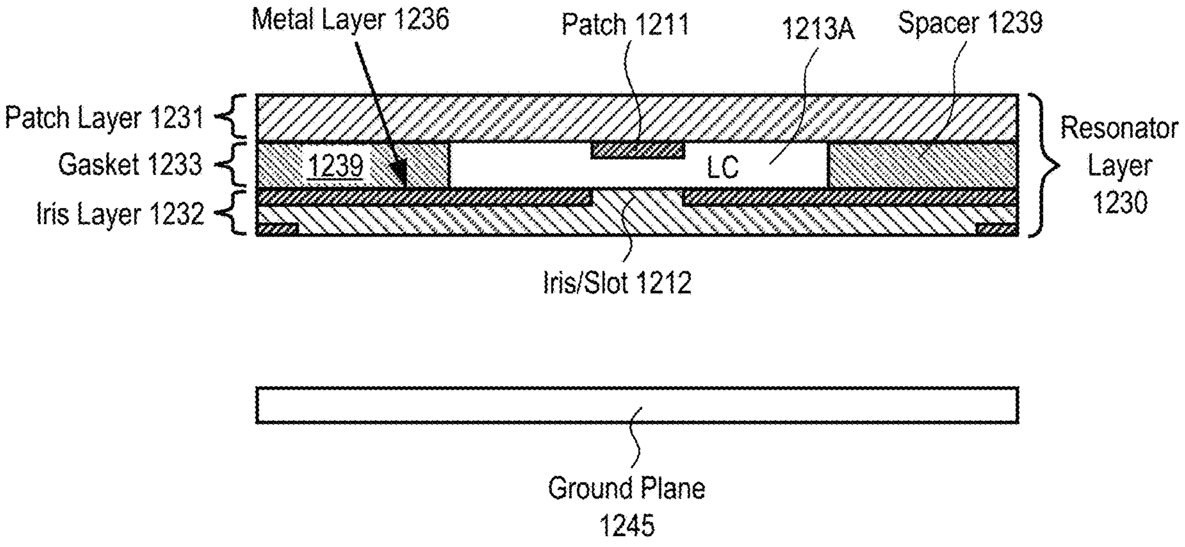
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1232, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 7, may have a microwave frequency compatible with satellite communication channels. The feed wave propagates between ground plane 1245 and resonator layer 1230.

Reconfigurable resonator layer 1230 also includes gasket layer 1233 and patch layer 1231. Gasket layer 1233 is disposed between patch layer 1231 and iris layer 1232. Note that in one embodiment, a spacer could replace gasket layer 1233. In one embodiment, iris layer 1232 is a printed circuit board ("PCB") that includes a copper layer as metal layer 1236. In one embodiment, iris layer 1232 is glass. Iris layer 1232 may be other types of substrates.

Openings may be etched in the copper layer to form slots 1212. In one embodiment, iris layer 1232 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1233 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213A is defined by spacers 1239, iris layer 1232 and metal layer 1236. When the chamber is filled with liquid crystal, patch layer 1231 can be laminated onto spacers 1239 to seal liquid crystal within resonator layer 1230.

A voltage between patch layer 1231 and iris layer 1232 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 6. Note that in this example the antenna array has two different types of antenna elements that are used for two different types of frequency bands.

Figure 9A:
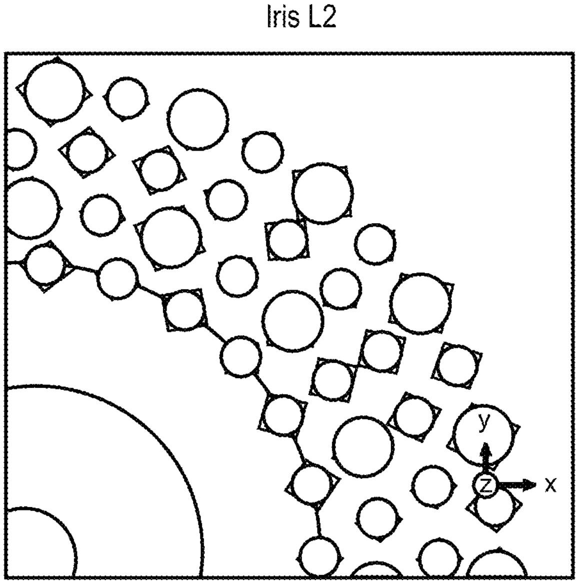
FIG. 9A illustrates a portion of the first iris board layer with locations corresponding to the slots.
Figure 9B:
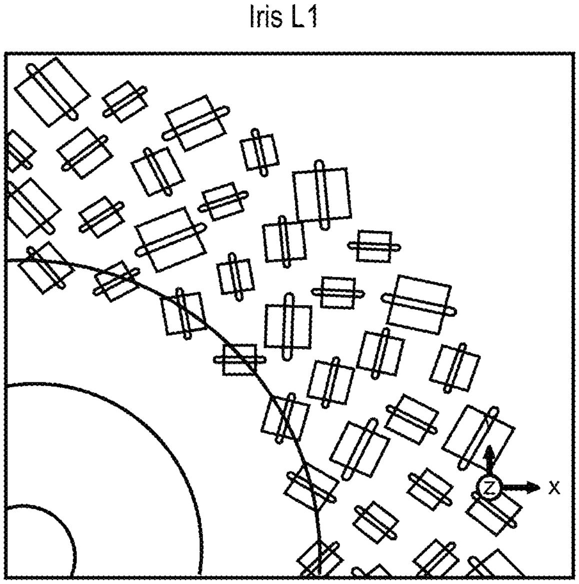
FIG. 9B illustrates a portion of the second iris board layer containing slots.
Figure 9C:
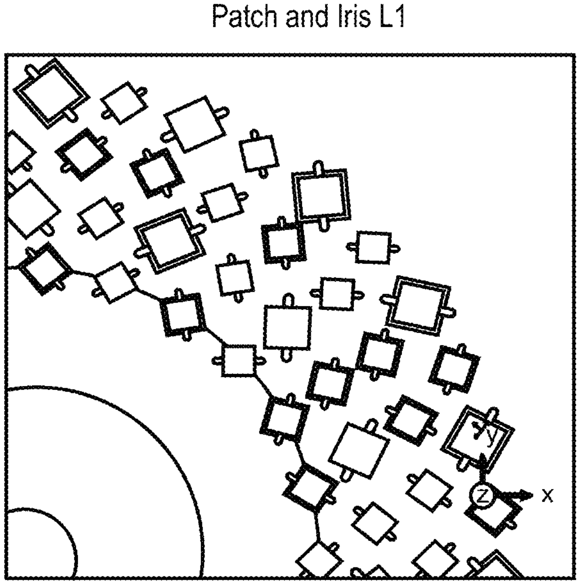
FIG. 9C illustrates patches over a portion of the second iris board layer.
Figure 9D:
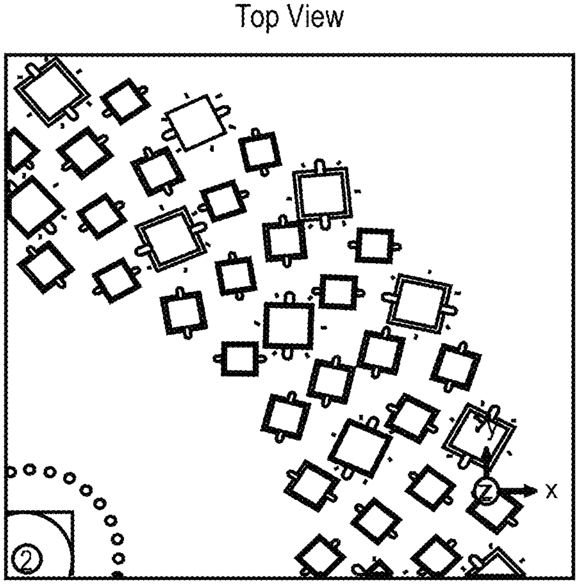
FIG. 9D illustrates a top view of a portion of the slotted array.

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
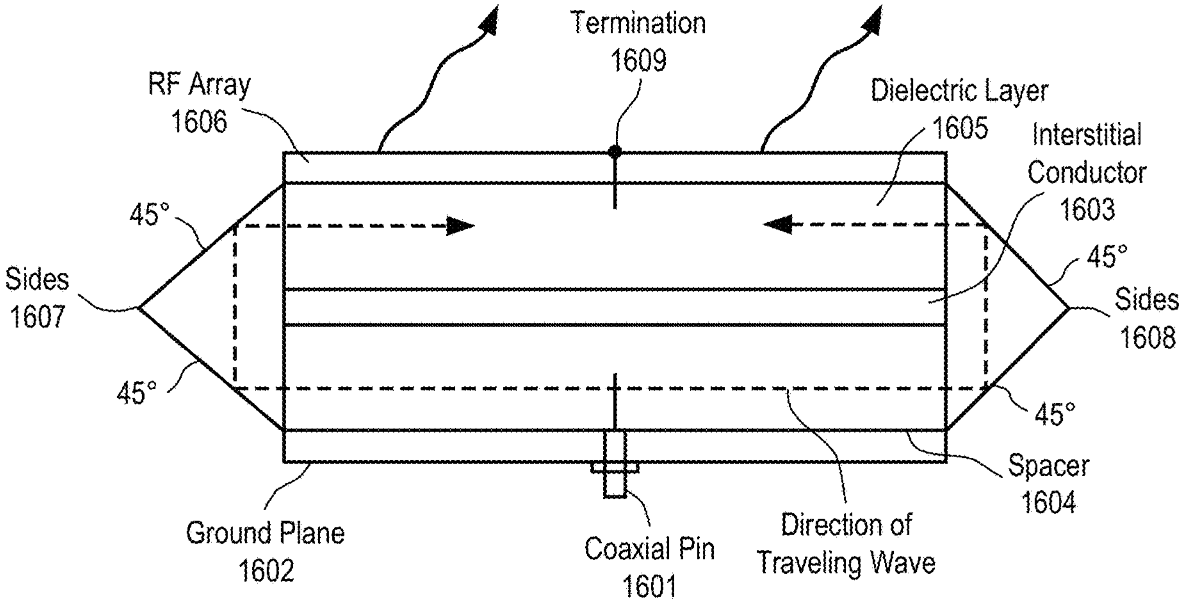
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$, is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
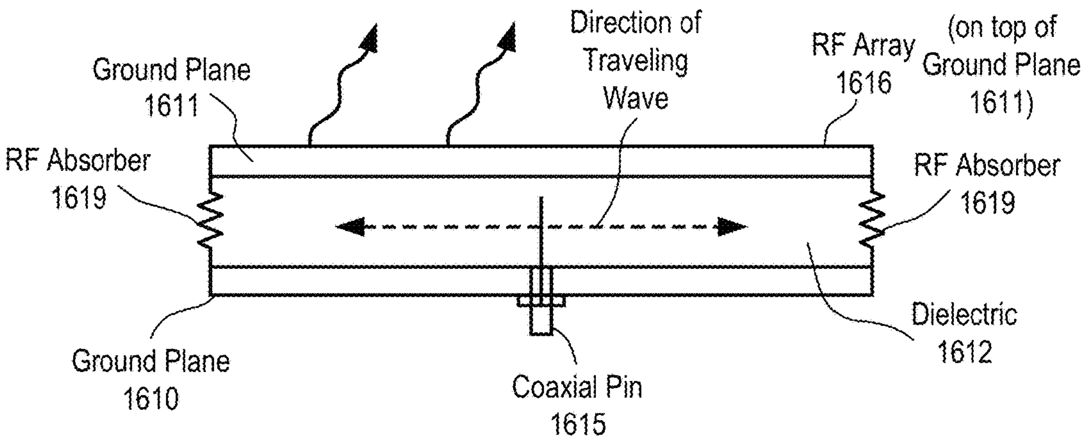
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
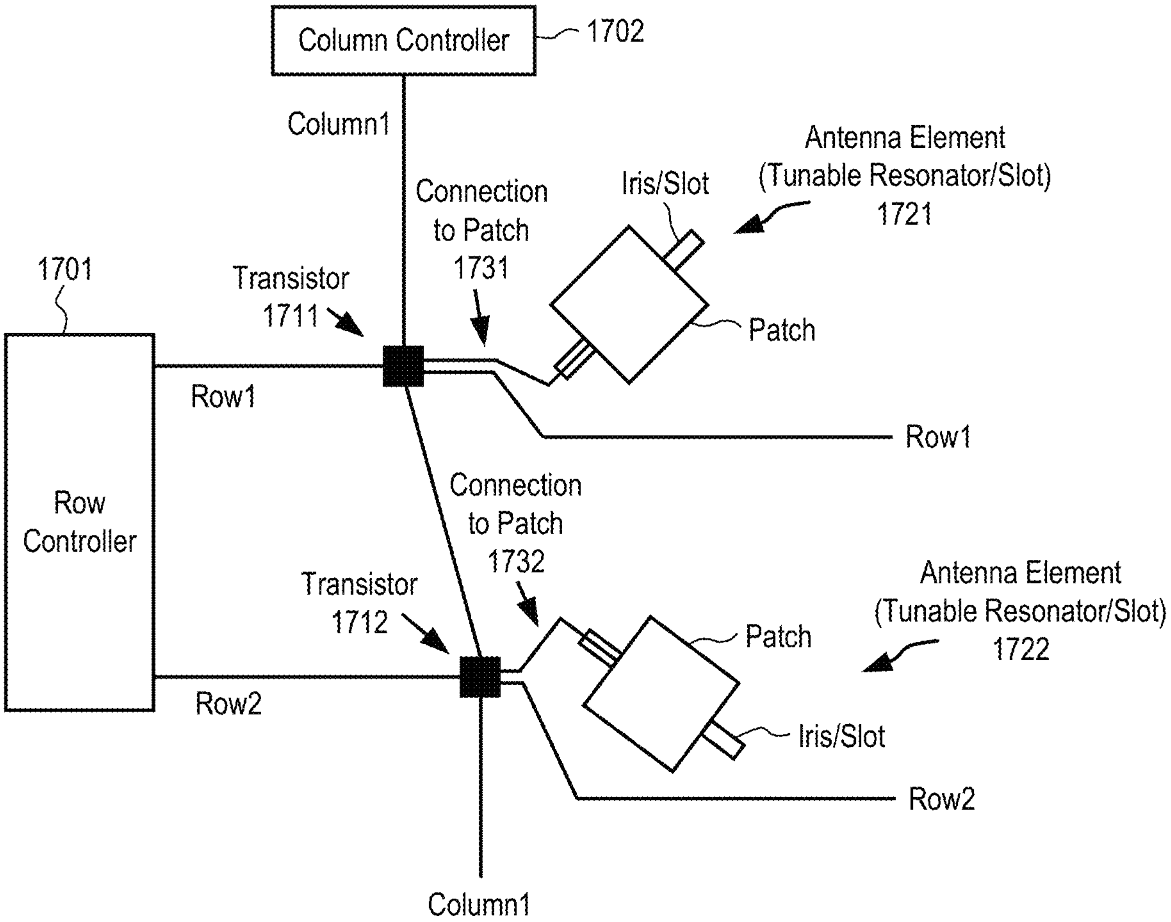
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
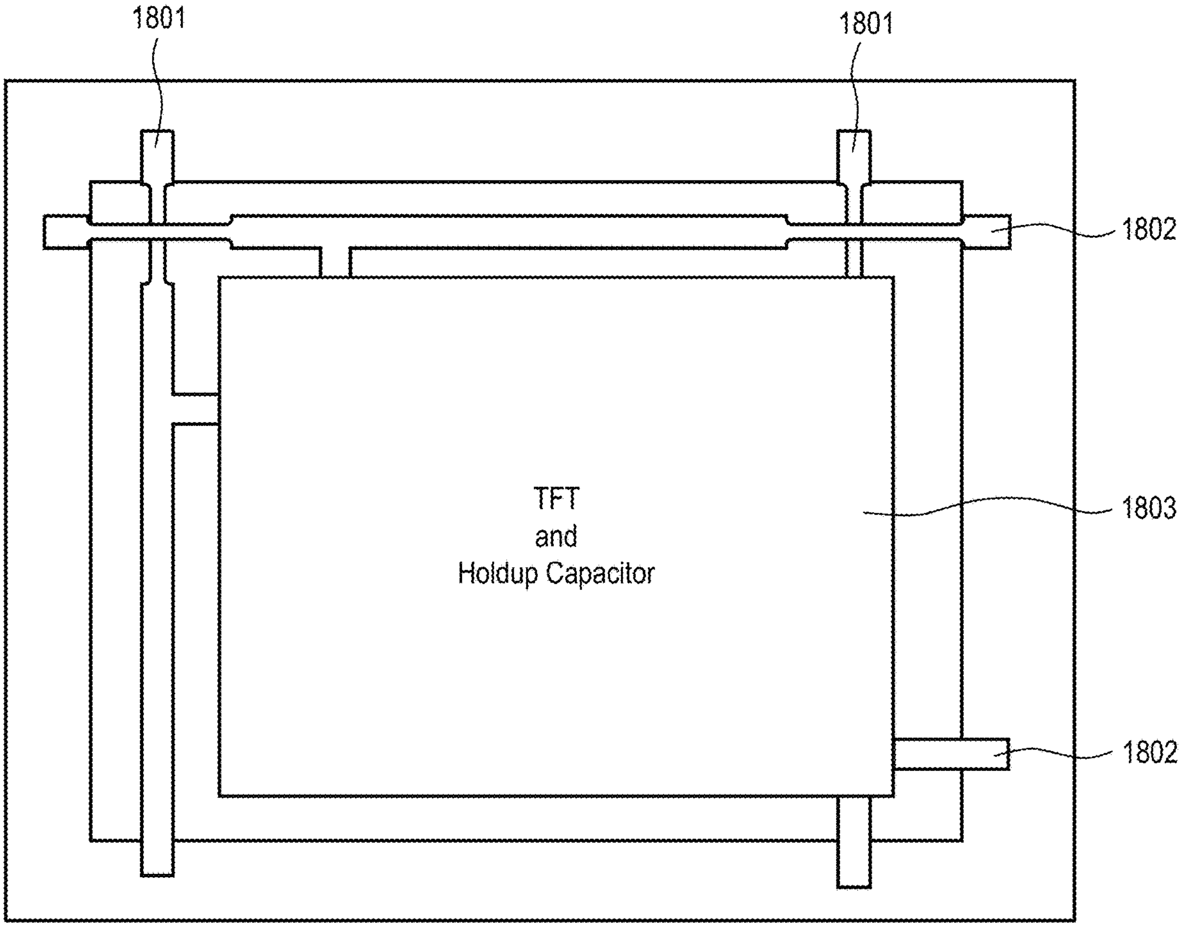
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
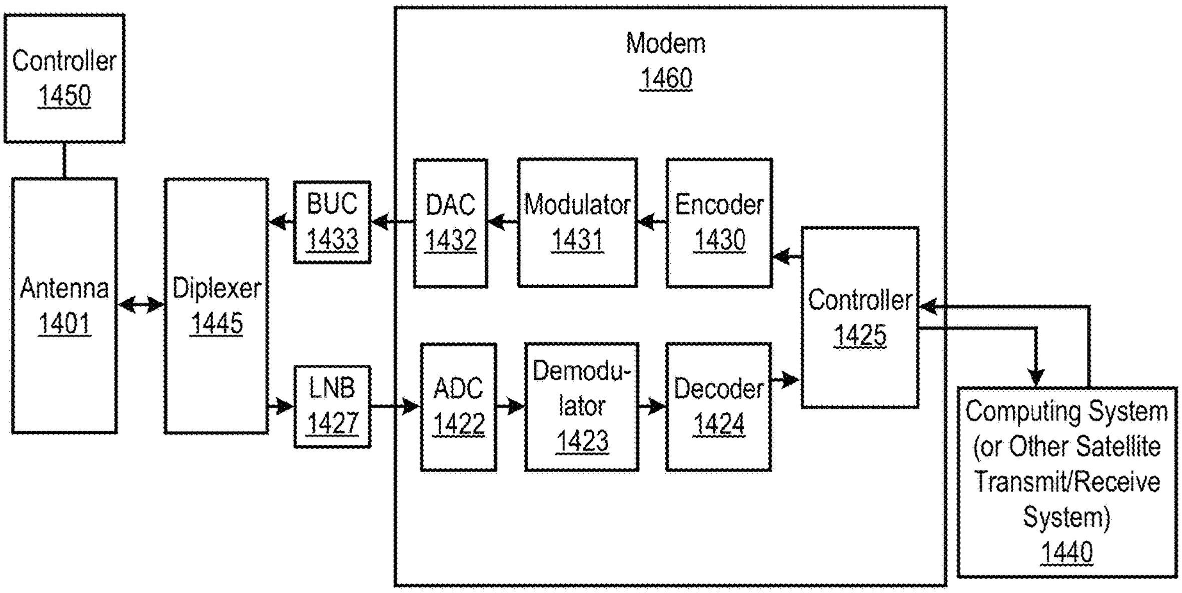
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNB) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is an antenna comprising an aperture having a plurality of radio-frequency (RF) radiating antenna elements, wherein each antenna element of the plurality of RF radiating antenna elements comprises an iris slot opening and an electrode over the iris slot opening; a plurality of drive transistors coupled to the plurality of antenna elements; and a plurality of storage capacitors, each storage capacitor coupled to the electrode of one antenna element of the plurality of antenna elements, wherein the aperture comprises at least one of: the drive transistor for the one antenna element is located under the electrode of the antenna element, the storage capacitor for the one antenna element is located under the electrode of the antenna element, and the metal routing to the one antenna element for a first voltage overlaps, in an overlap region, a common voltage routing that routes the common voltage to the one antenna element to form a storage capacitance.

Example 2 is the antenna of example 1 that may optionally include that the electrode comprises a patch.

Example 3 is the antenna of example 1 that may optionally include that the metal routing comprises drain metal routing coupling a storage capacitor of the plurality of storage capacitors to the electrode.

Example 4 is the antenna of example 3 that may optionally include that the drain metal routing is above or below the common voltage routing.

Example 5 is the antenna of example 3 that may optionally include that the overlap region provides a first capacitance that combines with a second capacitance of a storage capacitor to provide capacitance for the one antenna element, wherein one or both of width of the drain metal layer and width of the common voltage routing is set to obtain the first capacitance.

Example 6 is the antenna of example 1 that may optionally include that width of overlap area is larger under the electrode than outside of the electrode.

Example 7 is the antenna of example 1 that may optionally include that the drive transistor for the one antenna element is located under the electrode of the antenna element with the storage capacitor for the one antenna element.

Example 8 is the antenna of example 1 that may optionally include that the drive transistor for the one antenna element is located under the electrode of the antenna element and the storage capacitor for the one antenna element is located outside of the electrode of the antenna element.

Example 9 is the antenna of example 1 that may optionally include that the drive transistor for the one antenna element is located under the electrode of the antenna element and a first storage capacitor for the one antenna element is located under of the electrode of the antenna element and a second storage capacitor for the one antenna element is located outside of the electrode of the antenna element.

Example 10 is the antenna of example 1 that may optionally include that the electrode is part of a patch structure having a patch and a patch substrate, and further wherein a storage capacitor is formed underneath the electrode and resides between a patch metal layer of the patch structure and a patch substrate.

Example 11 is the antenna of example 10 that may optionally include that capacitance under the patch is adjusted by adjusting a common voltage metal layer.

Example 12 is the antenna of example 1 that may optionally include that the electrode is part of a patch structure having a patch and a patch substrate, and further wherein the drive transistors comprises TFTs and wherein at least one TFT is formed underneath the patch structure and resides between a patch metal layer and a patch substrate of the patch structure.

Example 13 is an antenna comprising: a plurality of radio-frequency (RF) radiating antenna elements, wherein each antenna element of the plurality of RF radiating antenna elements comprises an iris slot opening and an electrode over the iris slot opening; and a plurality of drive transistors, each drive transistor coupled to one antenna element of the plurality of antenna elements, wherein one or more metal routing lines between pairs of drive transistors is through one or more RF radiating antenna elements.

Example 14 is the antenna of example 13 that may optionally include that each drive transistor has drain and gate metal lines coupled to its source and gate, respectively, the drain metal line coupled to an electrode of an RF radiating antenna element, wherein the one or more metal routing lines comprises one or more of the source metal line and the gate metal line.

Example 15 is the antenna of example 13 that may optionally include that the one or more metal routing lines comprises common voltage routing.

Example 16 is the antenna of example 13 that may optionally include that the one or more metal routing lines are along a major axis of the at least one RF element.

Example 17 is the antenna of example 16 that may optionally include that the one or more metal routing lines comprises parallel routing lines, symmetric with respect to the major axis of the at least one RF element.

Example 18 is the antenna of example 13 that may optionally include that portions of one or more metal routing lines are formed on metal layers on a substrate to which the electrode is coupled between the electrode and the substrate.

Example 19 is the antenna of example 18 that may optionally include that the electrode is a patch electrode and the substrate is a patch substrate.

Example 20 is the antenna of example 1 that may optionally include a dielectric between the patch electrode and metal routing lines to reduce the parasitic capacitance between the patch electrode and the metal routing lines.

Example 21 is the antenna of example 13 that may optionally include that the metal routing lines are narrower when proximate to the electrode than when not proximate to the electrode.

Example 22 is the antenna of example 13 that may optionally include a via to connect a drain metal layer of a drive transistor to the electrode of at least one antenna element in an area that is outside an area above its corresponding iris slot opening.

Example 23 is an antenna comprising: a plurality of RF radiating antenna elements; and a plurality of structures coupled to the plurality of RF radiating antenna elements, each structure having a drive transistor coupled to a storage capacitor coupled to drive plurality of antenna elements, wherein each structure of the plurality of structures comprises a plurality of drain terminals.

Example 24 is the antenna of example 23 that may optionally include that the drive transistor is a TFT.

Example 25 is the antenna of example 23 that may optionally include that only one of the plurality of drain terminals is coupled to one or more RF elements on one or more different rings of RF antenna elements.

Example 26 is the antenna of example 23 that may optionally include that a drain line coupled to one of the plurality of drain terminals of one of the plurality of structures crosses a gate line coupled to the drive transistor of the one structure.

Example 27 is the antenna of example 23 that may optionally include that a drain line coupled to one of the plurality of drain terminals of one of the plurality of structures without crossing a gate line or a source line coupled to the drive transistor of the one structure.

Example 28 is the antenna of example 23 that may optionally include that a drain line coupled to one of the plurality of drain terminals of one of the plurality of structures exits the one structure in a direction opposite a source line coupled to the drive transistor of the one structure.

Example 29 is the antenna of example 23 that may optionally include that structures of the plurality of structures are aligned with routing that runs with a tangent to a local ring of antenna elements.

Example 30 is the antenna of example 29 that may optionally include that one or more connections for the routing lines of one or more of the TFT/storage capacitor structures are aligned with routing that runs with the tangent of the local ring of element.

Example 31 is the antenna of example 29 that may optionally include that one or more connections for the routing lines of one or more of the TFT/storage capacitor structures are aligned with routing that runs across the tangent of the local ring of element.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An antenna comprising:

an aperture having a plurality of radio-frequency (RF) radiating antenna elements, wherein each antenna element of the plurality of RF radiating antenna elements comprises an iris slot opening and an electrode over the iris slot opening;

a plurality of drive transistors coupled to the plurality of antenna elements; and a plurality of storage capacitors, each storage capacitor coupled to the electrode of one antenna element of the plurality of antenna elements, wherein the aperture comprises at least one of:

the drive transistor for the one antenna element is located under the electrode of the antenna element, the storage capacitor for the one antenna element is located under the electrode of the antenna element, and the metal routing to the one antenna element for a first voltage overlaps, in an overlap region, a common voltage routing that routes the common voltage to the one antenna element to form a storage capacitance.

2. The antenna of claim 1 wherein the electrode comprises a patch.

3. The antenna of claim 1 wherein the metal routing comprises drain metal routing coupling a storage capacitor of the plurality of storage capacitors to the electrode.

4. The antenna of claim 3 wherein the drain metal routing is above or below the common voltage routing.

5. The antenna of claim 3 wherein the overlap region provides a first capacitance that combines with a second capacitance of a storage capacitor to provide capacitance for the one antenna element, wherein one or both of width of the drain metal layer and width of the common voltage routing is set to obtain the first capacitance.

6. The antenna of claim 1 wherein width of overlap area is larger under the electrode than outside of the electrode.

7. The antenna of claim 1 wherein the drive transistor for the one antenna element is located under the electrode of the antenna element with the storage capacitor for the one antenna element.

8. The antenna of claim 1 wherein the drive transistor for the one antenna element is located under the electrode of the antenna element and the storage capacitor for the one antenna element is located outside of the electrode of the antenna element.

9. The antenna of claim 1 wherein the drive transistor for the one antenna element is located under the electrode of the antenna element and a first storage capacitor for the one antenna element is located under of the electrode of the antenna element and a second storage capacitor for the one antenna element is located outside of the electrode of the antenna element.

10. The antenna of claim 1 wherein the electrode is part of a patch structure having a patch and a patch substrate, and further wherein a storage capacitor is formed underneath the electrode and resides between a patch metal layer of the patch structure and a patch substrate.

11. The antenna of claim 10 wherein capacitance under the patch is adjusted by adjusting a common voltage metal layer.

12. The antenna of claim 1 wherein the electrode is part of a patch structure having a patch and a patch substrate, and further wherein the drive transistors comprises TFTs and wherein at least one TFT is formed underneath the patch structure and resides between a patch metal layer and a patch substrate of the patch structure.

13. An antenna comprising:

a plurality of radio-frequency (RF) radiating antenna elements, wherein each antenna element of the plurality of RF radiating antenna elements comprises an iris slot opening and an electrode over the iris slot opening;

a plurality of drive transistors, each drive transistor coupled to one antenna element of the plurality of antenna elements, wherein one or more metal routing lines between pairs of drive transistors is through one or more RF radiating antenna elements.

14. The antenna of claim 13 wherein each drive transistor has drain and gate metal lines coupled to its source and gate, respectively, the drain metal line coupled to an electrode of an RF radiating antenna element, wherein the one or more metal routing lines comprises one or more of the source metal line and the gate metal line.

15. The antenna of claim 13 wherein the one or more metal routing lines comprises common voltage routing.

16. The antenna of claim 13 wherein the one or more metal routing lines are along a major axis of the at least one RF element.

17. The antenna of claim 16 wherein the one or more metal routing lines comprises parallel routing lines, symmetric with respect to the major axis of the at least one RF element.

18. The antenna of claim 13 wherein portions of one or more metal routing lines are formed on metal layers on a substrate to which the electrode is coupled between the electrode and the substrate.

19. The antenna of claim 18 wherein the electrode is a patch electrode and the substrate is a patch substrate.

20. The antenna of claim 19 further comprising a dielectric between the patch electrode and metal routing lines to reduce the parasitic capacitance between the patch electrode and the metal routing lines.

21. The antenna of claim 13 wherein the metal routing lines are narrower when proximate to the electrode than when not proximate to the electrode.

22. The antenna of claim 13 further comprising a via to connect a drain metal layer of a drive transistor to the electrode of at least one antenna element in an area that is outside an area above its corresponding iris slot opening.

23. An antenna comprising:

a plurality of RF radiating antenna elements; and a plurality of structures coupled to the plurality of RF radiating antenna elements, each structure having a drive transistor coupled to a storage capacitor coupled to drive a plurality of antenna elements, wherein each structure of the plurality of structures comprises a plurality of drain terminals, wherein a drain line coupled to one of the plurality of drain terminals of one of the plurality of structures without crossing a gate line or a source line coupled to the drive transistor of the one structure.

24. The antenna of claim 23 wherein the drive transistor is a TFT.

25. The antenna of claim 23 wherein the one or more RF elements are on one or more different rings of RF antenna elements.

26. An antenna comprising:

a plurality of RF radiating antenna elements; and a plurality of structures coupled to the plurality of RF radiating antenna elements, each structure having a drive transistor coupled to a storage capacitor coupled to drive a plurality of antenna elements, wherein each structure of the plurality of structures comprises a plurality of drain terminals, wherein a drain line coupled to one of the plurality of drain terminals of one of the plurality of structures crosses a gate line coupled to the drive transistor of the one structure.

27. An antenna comprising:

a plurality of RF radiating antenna elements; and a plurality of structures coupled to the plurality of RF radiating antenna elements, each structure having a drive transistor coupled to a storage capacitor coupled to drive a plurality of antenna elements, wherein each structure of the plurality of structures comprises a plurality of drain terminals, wherein a drain line coupled to one of the plurality of drain terminals of one of the plurality of structures exits the one structure in a direction opposite a source line coupled to the drive transistor of the one structure.

28. An antenna comprising:

a plurality of RF radiating antenna elements; and a plurality of structures coupled to the plurality of RF radiating antenna elements, each structure having a drive transistor coupled to a storage capacitor coupled to drive a plurality of antenna elements, wherein each structure of the plurality of structures comprises a plurality of drain terminals, wherein structures of the plurality of structures are aligned with routing that runs with a tangent to a local ring of antenna elements.

29. The antenna of claim 28 wherein one or more connections for the routing lines of one or more of the TFT/storage capacitor structures are aligned with routing that runs with the tangent of the local ring of element.

30. The antenna of claim 28 wherein one or more connections for the routing lines of one or more of the TFT/storage capacitor structures are aligned with routing that runs across the tangent of the local ring of element.

* * * * *